United States Patent
Oshima et al.

(10) Patent No.: US 8,313,604 B2
(45) Date of Patent: Nov. 20, 2012

(54) CURABLE COMPOSITION AND TEMPORARY FIXATION METHOD OF MEMBER USING IT

(75) Inventors: Kazuhiro Oshima, Shibukawa (JP); Tomoyuki Kanai, Shibukawa (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 448 days.

(21) Appl. No.: 11/916,123

(22) PCT Filed: Jul. 3, 2006

(86) PCT No.: PCT/JP2006/313247
§ 371 (c)(1), (2), (4) Date: Nov. 30, 2007

(87) PCT Pub. No.: WO2007/004620
PCT Pub. Date: Jan. 11, 2007

(65) Prior Publication Data
US 2010/0012263 A1  Jan. 21, 2010

(30) Foreign Application Priority Data

Jul. 4, 2005 (JP) ................. 2005-194752
Aug. 2, 2005 (JP) ................. 2005-224101
Aug. 22, 2005 (JP) ................. 2005-239987
Sep. 27, 2005 (JP) ................. 2005-278984

(51) Int. Cl.
| | |
|---|---|
| B29C 65/00 | (2006.01) |
| B29C 71/04 | (2006.01) |
| B32B 37/00 | (2006.01) |
| B32B 38/10 | (2006.01) |
| B32B 7/00 | (2006.01) |
| B41J 2/16 | (2006.01) |
| C08J 3/28 | (2006.01) |
| C08F 2/46 | (2006.01) |
| C08F 26/02 | (2006.01) |
| C08F 126/02 | (2006.01) |
| C08F 226/02 | (2006.01) |
| C08F 20/00 | (2006.01) |
| C08F 118/02 | (2006.01) |
| C08K 3/32 | (2006.01) |
| C08L 31/00 | (2006.01) |
| C08L 33/00 | (2006.01) |

(52) U.S. Cl. .......... 156/247; 156/310; 156/326; 522/83; 522/120; 522/150; 524/417; 524/556; 526/302; 526/303.1; 526/319

(58) Field of Classification Search .......... 156/310, 156/247, 326; 526/319, 302, 303.1; 524/556, 524/417; 522/150, 120, 83
See application file for complete search history.

(56) References Cited

U.S. PATENT DOCUMENTS
3,745,653 A * 7/1973 Cohl ................. 433/24
(Continued)

FOREIGN PATENT DOCUMENTS
EP  1 502 569 A1  2/2005
(Continued)

OTHER PUBLICATIONS
U.S. Appl. No. 11/816,538, filed Aug. 17, 2007, Oshima, et al.
(Continued)

*Primary Examiner* — Michael Orlando
(74) *Attorney, Agent, or Firm* — Oblon, Spivak, McClelland, Maier & Neustadt, L.L.P.

(57) ABSTRACT

A method for temporarily fixing a member with a curable composition that includes (A) a polyfunctional (meth)acrylate, (B) phenol 2-mol ethylene oxide-modified acrylate, (C) a photopolymerization initiator, (D) a polar solvent, and (H) at least one granular material selected from the group consisting of polypropylene particles, crosslinked polymethyl methacrylate particles and crosslinked polystyrene particles.

12 Claims, 1 Drawing Sheet

| THICKNESS OF CURED COMPOSITION (UNIT: μm) | | | |
|---|---|---|---|
| 68 | 68 | 70 | 71 |
| 74 | 66 | 72 | 68 |
| 72 | 74 | 71 | 69 |
| 68 | 70 | 71 | 69 |

U.S. PATENT DOCUMENTS

| | | | |
|---|---|---|---|
| 3,928,113 A * | 12/1975 | Rosenberg | 156/344 |
| 3,943,190 A | 3/1976 | Abe et al. | |
| 4,575,539 A | 3/1986 | DeCrosta et al. | |
| 5,240,989 A | 8/1993 | Bernard et al. | |
| 6,174,935 B1 | 1/2001 | Matsunae et al. | |
| 6,326,417 B1 * | 12/2001 | Jia | 523/116 |
| 6,734,249 B1 | 5/2004 | Bulluck et al. | |
| 6,887,920 B2 * | 5/2005 | Ohtsuki et al. | 523/116 |
| 2001/0003031 A1 * | 6/2001 | Tamura et al. | 430/284.1 |
| 2001/0056133 A1 * | 12/2001 | Montgomery et al. | 523/113 |
| 2003/0059708 A1 * | 3/2003 | Yamamura et al. | 430/269 |
| 2004/0059013 A1 * | 3/2004 | Tanabe et al. | 522/90 |
| 2004/0162375 A1 * | 8/2004 | Ali et al. | 524/417 |
| 2004/0228998 A1 | 11/2004 | Haas | |
| 2005/0014861 A1 | 1/2005 | Qian | |
| 2005/0090626 A1 * | 4/2005 | Liu et al. | 525/529 |
| 2006/0058406 A1 * | 3/2006 | Matsumura et al. | 521/142 |
| 2007/0142528 A1 * | 6/2007 | Oshima et al. | 524/430 |
| 2007/0203257 A1 | 8/2007 | Qian | |

FOREIGN PATENT DOCUMENTS

| | | |
|---|---|---|
| EP | 1 544 272 A1 | 6/2005 |
| EP | 1 860 128 A1 | 11/2007 |
| JP | 1-207371 | 8/1989 |
| JP | 4 23875 | 1/1992 |
| JP | 6 116534 | 4/1994 |
| JP | 6-116535 | 4/1994 |
| JP | 6-184269 | 7/1994 |
| JP | 6-346040 | 12/1994 |
| JP | 7-90028 | 4/1995 |
| JP | 7-157531 | 6/1995 |
| JP | 7 228639 | 8/1995 |
| JP | 7-330835 | 12/1995 |
| JP | 8 277313 | 10/1996 |
| JP | 9-295880 | 11/1997 |
| JP | 10-130309 | 5/1998 |
| JP | 10-245526 | 9/1998 |
| JP | 10-251602 | 9/1998 |
| JP | 11-34243 | 2/1999 |
| JP | 11 71553 | 3/1999 |
| JP | 11-279242 | 10/1999 |
| JP | 2000-38547 | 2/2000 |
| JP | 2001-172336 | 6/2001 |
| JP | 2001-181355 | 7/2001 |
| JP | 2001 226641 | 8/2001 |
| JP | 2002-60442 | 2/2002 |
| JP | 2002 121230 | 4/2002 |
| JP | 2002-173516 | 6/2002 |
| JP | 2002 201229 | 7/2002 |
| JP | 2002 322214 | 11/2002 |
| JP | 2002-338900 | 11/2002 |
| JP | 2002-348534 | 12/2002 |
| JP | 2003-128714 A | 5/2003 |
| JP | 2003-155455 | 5/2003 |
| JP | 2003-313510 | 11/2003 |
| JP | 2004-143233 | 5/2004 |
| JP | 2004-182765 | 7/2004 |
| JP | 2005 170920 | 6/2005 |
| WO | WO 01/18082 A1 | 3/2001 |
| WO | WO 2005/017487 A2 | 2/2005 |

OTHER PUBLICATIONS

U.S. Appl. No. 12/159,231, filed Jun. 26, 2008, Kanai, et al.
U.S. Appl. No. 13/181,031, filed Jul. 12, 2011, Kanai, et al.
Office Action issued on Aug. 30, 2011 in the corresponding Japanese Patent Application No. JP-A-2005-239987 (with English Translation).
Office Action issued on Aug. 30, 2011 in the corresponding Japanese Patent Application No. JP-A-2005-224101 (with English Translation).
Foreign Office Action as received in the corresponding Japanese Patent Application No. 2005-194752 dated May 2, 2011.
Extended Search Report issued Oct. 6, 2011 in Europe Application No. 11004200.9.
Office Action issued Oct. 4, 2011 in Japan Application No. 2005-194752 (With English Translation).
Nippon Shokubai, "Nippon Shokubai Particle Products", XP000002658648, 2011, Retrieved from the Internet: URL http://www.shokubai.co.jp/en/products/electronic/epokara.html, pp. 1-4.
U.S. Appl. No. 13/436,025, filed Mar. 30, 2012, Kanai, et al.
Japanese Office Action issued on Apr. 24, 2012 in corresponding Japanese Application No. 2006-005597 (with an English Translation).
European Office Action issued May 7, 2012 in patent application No. 11 004 200.9.
Foreign Office Action as received in the corresponding Japanese Patent Application No. 2006-141023 dated Dec. 20, 2011 w/English Translation.

* cited by examiner

| THICKNESS OF CURED COMPOSITION (UNIT: μm) ||||
|---|---|---|---|
| 68 | 68 | 70 | 71 |
| 74 | 66 | 72 | 68 |
| 72 | 74 | 71 | 69 |
| 68 | 70 | 71 | 69 |

CURABLE COMPOSITION AND TEMPORARY FIXATION METHOD OF MEMBER USING IT

CROSS-REFERENCE TO RELATED APPLICATIONS

This application is a 371 of PCT/JP2006/313247 filed Jul. 3, 2006 and claims the benefit of JP 2005-194752 filed Jul. 4, 2005, JP2005-224101 filed Aug. 2, 2005, JP 2005-239887 filed Aug. 22, 2005, and JP 2005-278984 filed Sep. 27, 2005.

TECHNICAL FIELD

The present invention relates to a method for temporarily fixing a member in processing of various members, and a curable composition and an adhesive suitable for the fixation. More particularly, the present invention relates to a method for temporarily fixing an optical member e.g. at ordinary temperature in processing the member, a curable adhesive suitable for the method, and a curable composition which facilitates removal of the member.

BACKGROUND ART

Two-sided tapes and hot-melt type adhesives are used as adhesives for temporary fixation of optical lenses, prisms, arrays, silicon wafers, semiconductor packaging parts, and so on, and members bonded or laminated with use of these adhesives are cut into a predetermined shape, followed by removal of the adhesive to produce processed members. With respect to the semiconductor packaging parts, for example, they are fixed on a substrate with a two-sided tape and then cut into desired parts, and the two-sided tape is irradiated with ultraviolet rays to be separated from the parts. Furthermore, in the case of the hot-melt type adhesive, members are bonded therewith and heated to let the adhesive penetrate into their interspace, and then the members are cut into desired parts, followed by removal of the adhesive in an organic solvent.

However, in the case of the two-sided tape, there were problems that it was difficult to achieve satisfactory thickness accuracy; its adhesive strength was weak, so that in processing the parts, chipping of the parts was likely to occur (i.e. inferior in the chipping property); that it was impossible to separate the tape without heating at 100° C. or more; and that, where it was separated by irradiation with ultraviolet rays, it was impossible to separate the tape if an adherend had a poor UV transmittance.

In the case of the hot-melt type adhesive, it could not be effective in bonding without heating at 100° C. or more, so that there was a restriction on the members to be used. Furthermore, it was necessary to use an organic solvent in removal of the adhesive, and washing steps with an alkali solvent and a halogen type organic solvent were cumbersome and also problematic from the viewpoint of working environments.

In order to overcome these drawbacks, photocurable or heat-curable adhesives for temporary fixation were proposed which contain a water-soluble compound such as a water-soluble vinyl monomer. These adhesive compositions solved the problem of the removability in water, but they still had problems that the adhesive strength was low in fixation of parts and that the members after being cut had poor dimensional accuracy. Furthermore, adhesives for temporary fixation were proposed which had adhesion improved with use of a specific, highly hydrophilic (meth)acrylate, and also had removability improved by swelling and partial dissolution.

However, a cutting process involves generation of frictional heat between the parts and a cutting jig such as a blade or a diamond cutter and thus is carried out while cooling the parts with a large amount of water. Therefore, a cured resin of the above highly hydrophilic composition swells to become soft during the cutting, whereby higher dimensional accuracy cannot be achieved. In addition, the cured resin dissolved in part remains as a residual adhesive on the members after the removal, which causes a problem in appearance.

In addition, in the case of photocurable adhesives, there is a problem that the material for members to be processed is limited to a material which transmits light such as ultraviolet light, and a material not transmitting light, such as a ceramic material, a colored plastic material or the like, can not be used. Further, heat-curable adhesives such as epoxy resins require a heating apparatus in many cases and thus have a problem such that it takes time for curing, and further labor saving, energy saving and shortening of the working time are required. (cf. Patent Documents 1, 2 and 3).

Patent Document 1: JP-A-06-116534
Patent Document 2: JP-A-11-71553
Patent Document 3: JP-A-2001-226641

DISCLOSURE OF THE INVENTION

Object to be Accomplished by the Invention

In order to improve the dimensional accuracy of the members after cutting, a photocurable adhesive is desired, which is hydrophobic, high in adhesive strength, excellent in removability in water, free of an adhesive residue on the members after removal, and environmentally excellent in working.

The present inventors have conducted extensive studies to solve the above problems in the prior art, and as a result, have found it possible to accomplish the above object by using a combination of specific hydrophobic (meth)acryl monomers, based on the following findings (a) to (d):

(a) It is possible to obtain a curable composition having high adhesive strength and excellent removability in warm water by adding a hydrogel swelled with a polar solvent, to a copolymer made of a specific temperature-responsive polymer to an extent not to impair the adhesive property;

(b) it is possible to obtain a curable composition which is curable at ordinary temperature and has high adhesive strength and removability in warm water, by adding a polar organic solvent, an organic peroxide and a decomposition accelerator for the organic peroxide;

(c) it is possible to obtain a curable composition having high adhesive strength and excellent removability in warm water, by incorporating a specific polar organic solvent and a specific granular material; and (d) it is possible to obtain a curable composition having high adhesive strength and excellent removability in warm water, by adding a specific alcohol to such an extent not to impair the adhesive property.

Means to Accomplish the Object

The present invention provides the following:
1. A curable composition comprising (A) a polyfunctional (meth)acrylate, (B) a monofunctional (meth)acrylate, (C) a photopolymerization initiator, and (D) a polar solvent.
2. A curable composition comprising (A) a polyfunctional (meth)acrylate, (B) a monofunctional (meth)acrylate, (D) a polar solvent, (E) an organic peroxide, and (F) a decomposition accelerator for the organic peroxide.

3. The curable composition according to the above 1 or 2, wherein each of (A) and (B) is hydrophobic.

4. The curable composition according to any one of the above 1 to 3, wherein (D) is at least one member selected from the group consisting of water, methanol, ethanol, isopropyl alcohol and n-butanol.

5. The curable composition according to any one of the above 1 to 4, which further contains (G) a temperature-responsive polymer and/or a copolymer of a temperature-responsive polymer.

6. The curable composition according to the above 5, wherein (G) is (a) a polymer of at least one member selected from the group consisting of an N-alkyl (meth)acrylamide derivative, a nitrogen-containing cyclic monomer and a vinyl group-containing amino acid, and/or (b) a copolymer comprising a vinyl monomer and at least one member selected from the group consisting of an N-alkyl (meth)acrylamide derivative, a nitrogen-containing cyclic monomer and a vinyl group-containing amino acid.

7. The curable composition according to the above 5, wherein (G) is a copolymer comprising an N-alkyl (meth)acrylamide derivative, a vinyl monomer having a carboxyl group, and a vinyl monomer copolymerizable therewith.

8. The curable composition according to the above 6 or 7, wherein the N-alkyl(meth)acrylamide derivative is N-isopropyl acrylamide.

9. The curable composition according to the above 5, wherein G is a copolymer comprising N-isopropyl acrylamide, diacetone acrylamide and acrylic acid, and/or a copolymer comprising N-isopropyl acrylamide, acrylamide and acrylic acid.

10. The curable composition according to any one of the above 1 to 9, which further contains (H) a granular material, and (H) is insoluble in (A) to (G).

11. The curable composition according to the above 10, wherein (H) is spherical.

12. The curable composition according to the above 10 or 11, wherein (H) is at least one member selected from the group consisting of crosslinked polymethyl methacrylate particles, cross-linked polystyrene particles and spherical silica particles.

13. The curable composition according to any one of the above 1, 3 and 4, which comprises from 1 to 50 parts by mass of (A), from 5 to 95 parts by mass of (B), from 0.1 to 20 parts by mass of (C) and from 0.1 to 10 parts by mass of (D).

14. The curable composition according to any one of the above 2 to 4, which comprises from 1 to 50 parts by mass of (A), from 5 to 95 parts by mass of (B), from 0.1 to 10 parts by mass of (D), from 0.5 to 10 parts by mass of (E) and from 0.1 to 10 parts by mass of (F).

15. The curable composition according to any one of the above 2 to 4 and 14, which comprises a first liquid containing (A), (B) and (E), and a second liquid containing (A), (B) and (F), and either one or both of the first and second liquids contain (D).

16. The curable composition according to any one of the above 5 to 9, which comprises 100 parts by mass in total of (A) and (B), from 0.1 to 20 parts by mass of (C), from 0.1 to 20 parts by mass of (D), and from 0.001 to 10 parts by mass of (G).

17. The curable composition according to any one of the above 10 to 13, which further contains from 0.5 to 10 parts by mass of (H).

18. A process for producing the curable composition as defined in any one of the above 5 to 9 and 16, which comprises preparing a mixture of (G) and (D), and then, adding and simultaneously mixing (A), (B) and (C) to the above mixture.

19. An adhesive made of the curable composition as defined in any one of the above 1 to 17.

20. A structure temporarily fixed by means of the curable composition as defined in any one of the above 1 to 17.

21. A method for temporarily fixing a member, which comprises temporarily fixing the member by means of the curable composition as defined in the above 14 or 15, at a temperature of from −10° C. to 40° C.

22. A method for temporarily fixing a member, which comprises temporarily fixing the member by means of the curable composition as defined in any one of the above 1 to 17, processing the temporarily fixed member, and immersing the processed member in warm water of from 30 to 90° C., thereby to remove a cured resin of the curable composition.

23. The method for temporarily fixing a member according to the above 22, wherein a substrate is used for temporarily fixing the member, and the cured resin remains on the substrate when the cured resin is removed.

24. The method for temporarily fixing a member according to the above 23, wherein the surface roughness (RMax) of the substrate on the side facing the curable composition is from 10 μm to 50 μm and is larger by at least 10 μm than the surface roughness (RMax) of the member on the side facing the curable composition.

Effect of the Invention

The curable composition of the present invention is ordinary temperature-curable or photocurable by virtue of its composition and is cured with visible light or ultraviolet rays. Therefore, the composition of the present invention is considerably superior in laborsaving, energy saving and work reduction to the conventional hot-melt type adhesives. Furthermore, the cured resin of the composition shows a high adhesive strength without being affected by cutting water or the like used in processing, and thus provides an effect that displacement is unlikely to occur during processing of a member and it is thus easy to obtain the member excellent in dimensional accuracy.

Furthermore, the cured resin has a feature of losing the adhesive strength through contact with warm water of from 30 to 90° C., whereby the bonding strength between members or between a member and a jig, will be reduced to facilitate recovery of the member. As compared with the conventional adhesives, it provides an excellent effect that it is unnecessary to use an organic solvent which is expensive, is highly combustible or generates a gas harmful to human bodies.

Furthermore, in the case of the curable composition within a specific preferred composition range, the cured resin swells through contact with warm water of from 30 to 90° C., and is recovered in the form of a film from the member, thereby providing an effect of excellent workability.

Since the temporary fixation method of the member according to the present invention uses the curable composition losing the adhesive strength through contact with warm water of from 30 to 90° C., as described above, it is possible to recover the member simply through contact with warm water, and, as compared with the conventional adhesives, it provides a significant effect that it is unnecessary to use an organic solvent which is expensive, is highly combustible or generates a gas harmful to human bodies.

Further, in the preferred embodiment of the present invention, the curable resin of the curable composition can certainly be removed from the member, whereby the processing efficiency for the member can be substantially improved.

With respect to the temperature of the warm water, there is no technical significance to define the upper limit, but, from the viewpoint of operation efficiency, it is preferably from 30 to 90° C.

BRIEF DESCRIPTION OF DRAWING

FIG. 1-1 shows the results of measurement of the thickness distribution of a film of the composition according to Example 1-17.

BEST MODE FOR CARRYING OUT THE INVENTION

The polyfunctional (meth)acrylate (A) to be used in the present invention may be a polyfunctional (meth)acrylate oligomer/polymer having two or more (meth)acryloyl groups at terminals or in side chains of the oligomer/polymer, or a monomer having two or more (meth)acryloyl groups. The polyfunctional (meth)acrylate oligomer/polymer may, for example, be 1,2-polybutadiene-terminated urethane (meth)acrylate (e.g. TE-2000 or TEA-1000, manufactured by NIPPON SODA CO., LTD.), its hydrogenated product (e.g. TEA-1000, manufactured by NIPPON SODA CO., LTD.), 1,4-polybutadiene-terminated urethane (meth)acrylate (BAC-45, manufactured by OSAKA ORGANIC CHEMICAL INDUSTRY LTD.), polyisoprene-terminated (meth)acrylate, polyester urethane (meth)acrylate, polyether urethane (meth)acrylate, polyester (meth)acrylate, or bis A type epoxy(meth)acrylate (e.g. Biscoat #540, manufactured by OSAKA ORGANIC CHEMICAL INDUSTRY LTD., or Biscoat VR-77, manufactured by SHOWA HIGHPOLYMER CO., LTD.)

A bifunctional (meth)acrylate monomer may, for example, be 1,3-butylene glycol di(meth)acrylate, 1,4-butanediol di(meth)acrylate, 1,6-hexadiol di(meth)acrylate, 1,9-nonanediol di(meth)acrylate, neopentyl glycol di(meth)acrylate, dicyclopentanyl di(meth)acrylate, 2-ethyl-2-butyl-propanediol (meth)acrylate, neopentyl glycol-modified trimethylol propane di(meth)acrylate, stearic acid-modified pentaerythritol diacrylate, polypropylene glycol di(meth)acrylate, 2,2-bis(4-(meth)acryloxy diethoxyphenyl)propane, 2,2-bis(4-(meth)acryloxy propoxyphenyl)propane or 2,2-bis(4-(meth)acryloxy tetraethoxyphenyl)propane.

A trifunctional (meth)acrylate monomer may, for example, be trimethylolpropane tri(meth)acrylate or tris[(meth)acryloxyethyl]isocyanurate.

A tetrafunctional or higher-functional (meth)acrylate monomer may, for example, be dimethylolpropane tetra(meth)acrylate, pentaerythritol tetra(meth)acrylate, pentaerythritolethoxy tetra(meth)acrylate, dipentaerythritol penta(meth)acrylate or dipentaerythritol hexa(meth)acrylate.

(A) is more preferably hydrophobic. If it is water-soluble, the cured resin of the composition may swell during cutting, to cause displacement and degrade machining accuracy, such being undesirable. However, it may be hydrophilic unless the cured resin of the composition significantly swells or dissolves in part with water.

The amount of (A) to be added is preferably from 1 to 50 parts by mass, particularly preferably from to 30 parts by mass, per 100 parts by mass of the total amount of (A) and (B). If it is at least 1 part by mass, the removable nature of the cured resin of the curable composition from the adherend (hereinafter referred to simply as "the removability") will be sufficiently improved when the cured resin is immersed in warm water, and the cured resin of the curable composition can certainly be removed in the form of a film. On the other hand, when the amount is at most 50 parts by mass, the initial adhesion can be maintained without deterioration.

The monofunctional (meth)acrylate monomer (B) may, for example, be methyl (meth)acrylate, ethyl (meth)acrylate, propyl (meth)acrylate, butyl (meth)acrylate, 2-ethylhexyl (meth)acrylate, isooctyl (meth)acrylate, isodecyl(meth)acrylate, lauryl (meth)acrylate, stearyl(meth)acrylate, phenyl (meth)acrylate, cyclohexyl(meth)acrylate, dicyclopentanyl (meth)acrylate, dicyclopentenyl (meth)acrylate, dicyclopentenyloxyethyl(meth)acrylate, isobornyl(meth)acrylate, methoxylated cyclodecatriene (meth)acrylate, 2-hydroxyethyl(meth)acrylate, 2-hydroxypropyl (meth)acrylate, 3-hydroxypropyl (meth)acrylate, 4-hydroxybutyl(meth)acrylate, tetrahydrofurfuryl(meth)acrylate, 2-hydroxy-3-phenoxypropyl (meth)acrylate, glycidyl(meth)acrylate, caprolactone-modified tetrahydrofurfuryl(meth)acrylate, 3-chloro-2-hydroxypropyl(meth)acrylate, N,N-dimethylaminoethyl (meth)acrylate, N,N-diethylaminoethyl (meth)acrylate, t-butylaminoethyl(meth)acrylate, ethoxycarbonylmethyl(meth)acrylate, phenol ethylene oxide-modified acrylate, phenol(2-mol ethylene oxide-modified) acrylate, phenol(4-mol ethylene oxide-modified) acrylate, paracumylphenol ethylene oxide-modified acrylate, nonylphenol ethylene oxide-modified acrylate, nonylphenol (4-mol ethylene oxide-modified) acrylate, nonylphenol (8-mol ethylene oxide-modified) acrylate, nonylphenol (2.5-mol propylene oxide-modified) acrylate, 2-ethylhexyl carbitol acrylate, ethylene oxide-modified phthalic acid (meth)acrylate, ethylene oxide-modified succinic acid (meth)acrylate, trifluoroethyl (meth)acrylate, acrylic acid, methacrylic acid, maleic acid, fumaric acid, ω-carboxy-polycaprolactone mono(meth)acrylate, phthalic acid monohydroxyethyl (meth)acrylate, (meth)acrylic acid dimer, β-(meth)acroyloxyethyl hydrogen succinate, or n-(meth)acryloyloxyalkyl hexahydrophthalimide.

Like the above (A), (B) is more preferably hydrophobic. If it is water-soluble, the cured resin of the curable composition may swell during cutting, to cause displacement and degrade machining accuracy, such being undesirable. However, it can be hydrophilic unless the cured resin of the curable composition significantly swells or dissolves in part with water.

The amount of (B) to be added is preferably from 5 to 95 parts by mass, particularly preferably from 10 to 80 parts by mass, per 100 parts by mass of the total amount of (A) and (B). When it is at least 5 parts by mass, the initial adhesion can be maintained without deterioration, and when it is at most 95 parts by mass, the removability can be secured, and the cured resin of the curable composition can be removed in the form of a film.

The adhesion to a metal surface can be further improved by incorporating, to the above blend composition of (A) and (B), a phosphate having a vinyl group or a (meth)acryl group, such as (meth)acryloyloxyethyl acid phosphate, dibutyl 2-(meth)acryloyloxyethyl acid phosphate, dioctyl 2-(meth)acryloyloxyethyl phosphate, diphenyl 2-(meth)acryloyloxyethyl phosphate or (meth)acryloyloxyethyl polyethylene glycol acid phosphate.

The photopolymerization initiator (C) is incorporated in order to effect sensitization with active rays such as visible light or ultraviolet rays to enhance the photocuring property of the composition, and can be one of various known photopolymerization initiators.

Specifically, it may, for example, be benzophenone or its derivative; benzyl or its derivative; anthraquinone or its derivative; benzoin or a benzoin derivative such as, benzoin methyl ether, benzoin ethyl ether, benzoin propyl ether, benzoin isobutyl ether or benzyl dimethyl ketal; an acetophenone derivative such as diethoxyacetophenone, or 4-t-butyltrichloroacetophenone; 2-dimethylaminoethyl benzoate, p-dimethylaminoethyl benzoate, diphenyl disulfide, thioxanthone or their derivatives; camphor quinone or a camphor quinone derivative such as 7,7-dimethyl-2,3-dioxobicyclo[2.2.1]heptane-1-carboxylic acid, 7,7-dimethyl-2,3-dioxobicyclo[2.2.1]heptane-1-carboxy-2-bromoethylester, 7,7-dimethyl-2,3-dioxobicyclo[2.2.1]heptane-1-carboxy-2-methyl ester or 7,7-dimethyl-2,3-dioxobicyclo[2.2.1]heptane-1-carboxylic acid chloride; an α-amino alkylphenone derivative such as 2-methyl-1-[4-(methylthio)phenyl]-2-morpholino propan-1-one or 2-benzyl-2-dimethylamino-1-(4-morpholino phenyl)-butanone-1; or an acyl phosphine oxide derivative such as benzoyl diphenyl phosphine oxide, 2,4,6-trimethyl benzoyl diphenyl phosphine oxide, benzoyl diethoxyphosphine oxide, 2,4,6-trimethyl benzoyl dimethoxyphenylphosphine oxide or 2,4,6-trimethyl benzoyl diethoxyphenylphosphine oxide. The photopolymerization initiators can be used alone or in combination as a mixture of two or more of them.

The amount of the photopolymerization initiator (C) to be added is preferably from 0.1 to 20 parts by mass, more preferably from 3 to 20 parts by mass, per 100 parts by mass of the total amount of (A) and (B). When the amount is at least 0.1 part by mass, it is certainly possible to obtain the effect of promoting the curing. On the other hand, when the amount is at most 20 parts by mass, a sufficient curing rate can be obtained. A more preferred embodiment is such that (C) is added by at least 3 parts by mass, which is further preferred in that the composition becomes curable regardless of the light irradiation level, the crosslinking degree of the cured resin of the curable composition becomes higher, no displacement occurs during cutting, and the removability is improved.

Further, as a curing initiator, (E) an organic peroxide and (F) a decomposition accelerator for the organic peroxide, may be used.

Examples of the organic peroxide (E) include hydroperoxides, such as tertiary butyl hydroperoxide, cumene hydroperoxide, diisopropylbenzene hydroperoxide, paramenthane hydroperoxide, 2,5-dimethylhexane-2,5-dihydroperoxide and 1,1,3,3-tetramethylbutyl hydroperoxide; ketone peroxides, such as methyl ethyl ketone peroxide, cyclohexanone peroxide, 3,3,5-trimethylcyclohexanone peroxide, methylcyclohexanone peroxide, methylacetoacetate peroxide and acetylacetone peroxide; and diacyl peroxides, such as acetyl peroxide, isobutyl peroxide, octanoyl peroxide, decanoyl peroxide, laurynoyl peroxide, 3,3,5-trimethylhexanoyl peroxide, succinic acid peroxide, benzoyl peroxide, 2,4-dichlorobenzoyl peroxide and meta-toluoyl peroxide. These organic peroxides may be used alone or in combination as a mixture of two or more of them.

The amount of (E) to be added is preferably from 0.5 to 10 parts by mass, more preferably from 1 to 8 parts by mass, per 100 parts by mass of the total amount of (A) and (B). When the amount is at least 0.5 part by mass, the curing property can certainly be obtained, and when it is at most 10 parts by mass, the adhesion and the storage stability can be maintained without substantial deterioration, and the dermal irritation will be low, such being desirable.

In a case where a hydroperoxide or a ketone peroxide is used as the organic peroxide, the decomposition accelerator (F) for the organic peroxide may, for example, be a metal salt of an organic acid or an organic metal chelate, such as cobalt naphthenate, copper naphthenate, manganese naphthenate, cobalt octenoate, copper octenoate, manganese octenoate, copper acetylacetonate, titanium acetylacetonate, manganese acetylacetonate, chromium acetylacetonate, iron acetylacetonate, vanadinyl acetylacetonate or cobalt acetylacetonate.

Further, as decomposition accelerators for other organic peroxides, thiourea derivatives such as diethylthiourea, dibutylthiourea, ethylenethiourea, tetramethylthiourea, mercaptobenzoimidazole and benzothiourea may, for example, be used.

Further, in a case where as the organic peroxide, a diacylperoxide such as benzoyl peroxide is used, the decomposition accelerator for the organic peroxide may, for example, be an amine such as N,N-dimethyl-p-toluidine, N,N-diethyl-p-toluidine, N,N-di(2-hydroxyethyl)-p-toluidine, N,N-diisopropanol-p-toluidine, triethylamine, tripropylamine, ethyldiethanolamine, N,N-dimethylaniline, ethylenediamine, triethanolamine or an aldehyde-amine condensation reaction product.

These decomposition accelerators for organic peroxides may be used alone or in combination as a mixture of two or more of them.

The amount of (F) to be used is preferably from 0.1 to 10 parts by mass, more preferably from 0.5 to 8 parts by mass, per 100 parts by mass of the total amount of (A) and (B). When the amount is at most 10 parts by mass, the adhesion and the storage stability can be maintained without substantial deterioration, such being desirable.

The polar solvent (D) to be used in the present invention preferably has a boiling point of from 50 to 130° C., particularly preferably from 60 to 120° C. When a polar solvent having a boiling point within the above range is selected for use, it is more certainly possible to develop the phenomenon to lower the adhesive strength of the cured resin after curing by contact with warm water, such being desirable. Such a polar solvent may, for example, be water, an alcohol, a ketone or an ester. As a result of a study by the present inventors, water or an alcohol is preferably selected for use among them.

The alcohol may, for example, be methanol, ethanol, n-propanol, isopropanol, n-butanol, isobutanol, secondary butanol, tertiary butanol, n-amyl alcohol, isoamyl alcohol or 2-ethylbutyl alcohol. Among them, methanol, ethanol, n-propanol, isopropanol, n-butanol, isobutanol, secondary butanol or tertiary butanol, which has a boiling point of not higher than 120° C., is preferred. Particularly preferred is methanol, ethanol, isopropanol or n-butanol.

The amount of (D) to be added, is preferably from 0.5 to 20 parts by mass, more preferably from 3 to 20 parts by mass, per 100 parts by mass of the total amount of (A) and (B). When the amount is at least 0.5 part by mass, the removability can be secured, and when it is at most 20 parts by mass, the initial adhesion can be maintained without deterioration, and the cured resin of the curable composition can be removed in the form of a film.

Further, it is effective from the viewpoint of the removability to add (D) wherein (G) a temperature-responsive polymer as described below, is added, dispersed and swelled.

In the present invention, (G) a temperature-responsive polymer is a homopolymer made of a monomer and/or a copolymer made of two or more monomers, and it may be dispersed and swelled in the polar solvent (D) to obtain a mixture, and the mixture may be used in combination with (A) and (B). It is thereby possible to certainly develop the phenomenon to lower the adhesive strength of the cured resin after curing by contacting it with warm water to let it easily swell.

The temperature-responsive polymer (G) is a polymer having a nature to shrink and desorb water at a temperature of at least a certain level and to absorb water at a temperature lower than such a level, i.e. a lower critical consolute temperature with water (a temperature at which the polymer changes from water-soluble to water-insoluble). By utilizing such a nature, this polymer is practically employed as a water-absorbing material for diapers, as a modifying agent for soil, a gradually drug-releasing substrate for a drug delivery system or as a cell culture sheet.

Specifically, (G) may, for example, be a temperature-responsive polymer such as methylcellulose, hydroxypropyl methylcellulose, hydroxypropyl cellulose, poly(meth)acrylic acid, a partially saponified product of polyethylene/polyvinyl acetate, polyethylene oxide, polyvinyl methyl ether, poly(N-alkyl(meth)acrylamide), poly(N-vinylpyrrolidone), poly (ethyloxazoline) or poly(hydroxypropyl acrylate) and/or a copolymer having such polymers three-dimensionally crosslinked with a crosslinking agent such as a polyfunctional vinyl monomer.

Among them, (a) a polymer of at least one member selected from the group consisting of an N-alkyl (meth)acrylamide derivative, a nitrogen-containing cyclic monomer and a vinyl group-containing amino acid, and/or (b) a copolymer made of a vinyl monomer and at least one monomer selected from the group consisting of an N-alkyl (meth)acrylamide derivative, a nitrogen-containing cyclic monomer and a vinyl group-containing amino acid, is preferred. Here, the vinyl monomer is a vinyl monomer copolymerizable with the N-alkyl(meth) acrylamide derivative, the nitrogen-containing cyclic monomer or the vinyl group-containing amino acid.

The N-alkyl(meth)acrylamide derivative may, for example, be N-n-propyl(meth)acrylamide, N-isopropyl acrylamide, N-cyclopropyl acrylamide or N-n-ethyl acrylamide. The nitrogen-containing cyclic monomer may, for example, be N-acryloylpyrrolidiene, N-acryloylpiperazine, N-acryloylmorpholine or 1,4-dimethylpiperazine. The vinyl group-containing amino acid may, for example, be N-acryloyl-N-pyrroline, N-acryloyl-N-pyrroline methyl ester, N-methacryloyl-N-leucine methyl ester, N-methacryloyl-L-isoleucine methyl ester, methyl N-methacryloyl-L-glutamate or N-methacryloyl-L-vaniline methyl ester, including a vinyl group-containing amino ester derivative.

The copolymerizable vinyl monomer may, for example, be a vinyl monomer such as (meth)acrylamide, diacetone acrylamide, (meth)acrylate, (meth)acrylnitrile, styrene or vinyl acetate; a crosslinkable monomer such as N,N-methylenebis (meth)acrylamide, ethylene glycol di(meth)acrylate, polyethylene glycol di(meth)acrylate, propylene glycol di(meth) acrylate or glycerol tri(meth)acrylate; or a dicarboxylic acid such as maleic acid, phthalic acid or itaconic acid.

From the viewpoint of the temperature-responsive properties, a polymer made of N-isopropyl acrylamide and/or its copolymer with a vinyl monomer, is preferred as the temperature-responsive polymer and/or the copolymer of the temperature-responsive polymer (G) among the polymer of at least one member selected from the group consisting of an N-alkyl(meth)acrylamide derivative, a nitrogen-containing cyclic monomer and a vinyl group-containing amino acid, and/or the copolymer made of a vinyl monomer and at least one monomer selected from the group consisting of an N-alkyl(meth)acrylamide derivative, a nitrogen-containing cyclic monomer and a vinyl group-containing amino acid.

More preferred is a copolymer comprising an N-alkyl (meth)acrylamide derivative, a carboxyl group-containing vinyl monomer, and a vinyl monomer copolymerizable therewith.

Particularly preferred among them is a copolymer made of N-isopropylacrylamide, diacetone acrylamide and acrylic acid, or a copolymer made of N-isopropylacrylamide, acrylamide and acrylic acid.

The method for obtaining the temperature-responsive polymer or the copolymer of such a temperature-responsive polymer, may, for example, be a method wherein a crosslinkable monomer is copolymerized at the time of polymerizing the above-mentioned monomer to develop the temperature-responsive properties, or a method wherein after the polymerization, the obtained temperature-responsive polymer or the copolymer of the temperature-responsive polymer is crosslinked by irradiation with electron beams, etc. However, the method useful for the present invention is not limited thereto.

The amount of (G) is preferably from 0.001 to 10 parts by mass, more preferably from 0.01 to 1 part by mass, per 100 parts by mass of the total amount of (A) and (B). When the amount is at least 0.001 part by mass, the removability can be secured, and when the amount is at most 10 parts by mass, the initial adhesion can be maintained without deterioration, and the cured resin of the curable composition can be removed in the form of a film.

As a method for adding (G), a method is preferred wherein (G) is preliminarily dispersed and swelled in (D) at a temperature of not higher than room temperature, and the swelled dispersion is added to the composition comprising (A), (B) and (C). Specifically, a method is preferred wherein a mixture is prepared by adjusting the blend ratio by mass of (G):(D) to be from 1:0.1 to 1:1,000 at a temperature of not higher than room temperature, and the composition comprising (A), (B) and (C) is added to the mixture.

The granular material (H) to be used in the present invention is one insoluble in the above (A) to (G). When (H) is used together with (A) to (G), the cured resin can be maintained to have a constant thickness, whereby machining accuracy can be improved. Further, it is possible to certainly develop the phenomenon to lower the adhesive strength by contacting the cured resin with warm water to let it easily swell.

The material for (H) may be either organic particles or inorganic particles, which are commonly employed. Specifically, the organic particles may, for example, be polyethylene particles, polypropylene particles, crosslinked polymethyl methacrylate particles or crosslinked polystyrene particles. The inorganic particles may, for example, be ceramic particles such as glass, silica, alumina or titanium.

(H) is preferably spherical with a view to improving machining accuracy i.e. control of the film thickness of the adhesive. It is particularly preferably spherical particles, whereby the long/short diameter ratio of the granular material is within a range of from 0.8 to 1. Specifically, the organic particles may be crosslinked polymethyl methacrylate particles or crosslinked polystyrene particles obtainable as monodisperse particles by a known emulsion polymerization of a crosslinking monomer with a methyl methacrylate monomer or a styrene monomer. Further, as inorganic particles, spherical silica may be mentioned. These particles are preferred, since they are substantially free from deformation or fluctuation in the particle size, whereby the film thickness of the composition after curing will be uniform. Among them, crosslinked polymethyl methacrylate particles or crosslinked polystyrene particles are particularly preferred from the viewpoint of the storage stability such as sedimentation of particles, or the reactivity of the curable composition.

The film thickness of the cured resin of the curable composition can be suitably selected depending upon the type, shape, size, etc. of the member. Accordingly, (H) preferably has an average particle size of from 1 to 300 μm, particularly preferably from 10 to 200 μm. When the average particle size is at least 1 μm, the removability can be secured, and when it is at most 300 μm, machining accuracy will not deteriorate. Further, the narrower the distribution of the particle size, the better.

The amount of (H) is preferably from 0.1 to 20 parts by mass, more preferably from 0.1 to 10 parts by mass, per 100 parts by mass of the total amount of (A) and (B). When the amount is at least 0.1 part by mass, the film thickness of the cured resin will be substantially constant, and when it is at most 20 parts by mass, the initial adhesive will be maintained without deterioration.

In order to improve the storage stability, the curable composition according to the present invention may contain a small amount of a polymerization inhibitor. The polymerization inhibitor may, for example, be methyl hydroquinone, hydroquinone, 2,2-methylene-bis(4-methyl-6-tertiary-butylphenol), catechol, hydroquinone monomethyl ether, monotertiary butylhydroquinone, 2,5-ditertiary butylhydroquinone, p-benzoquinone, 2,5-diphenyl-p-benzoquinone, 2,5-ditertiary-butyl-p-benzoquinone, picric acid, citric acid, phenothiazine, tertiary-butyl catechol, 2-butyl-4-hydroxy anisole or 2,6-ditertiary-butyl-p-cresol.

The amount of the polymerization inhibitor to be used is preferably from 0.001 to 3 parts by mass, more preferably from 0.01 to 2 parts by mass, per 100 parts by mass of the total amount of (A) and (B). When the amount is at least 0.001 part by mass, the storage stability can be secured. On the other hand, when the amount is at most 3 parts by mass, good adhesion can be obtained, and the composition can be prevented from being uncured.

The curable composition of the present invention may contain an additive, such as an elastomer of various type, e.g., acryl rubber, urethane rubber or acrylonitrile-butadiene-styrene rubber, an inorganic filler, a solvent, an extender, a reinforcing material, a plasticizer, a thickener, a dye, a pigment, a flame retardant, a silane coupling agent or a surfactant, within a range not to impair the object of the present invention.

Further, in a case where (E) and (F) are to be used as curing initiators, it is common that (A) to (F) are used as mixed and stirred. The curable composition in such a case may be used in the form of one-pack type or two-pack type.

As one-pack type, there may be mentioned a method wherein (A), (B), (F) and (D) are preliminarily mixed, and at the time of use, (E) is added, or a method wherein (A), (B), (E) and (D) are preliminarily mixed, and at the time of use, (F) is mixed.

In the case of using the composition as of two-pack type, there may be mentioned a method wherein one having (A) and (B) mixed is divided into two liquids, (E) is added to one liquid, (F) is added to the other liquid, (D) is added to either one or both of the liquids, and at the time of actual use, the two liquids are mixed.

The temporary fixation method of the present invention comprises bonding a member by means of the curable composition which loses the adhesive strength upon contact with warm water of from 30 to 90° C., curing the curable composition to temporarily fix the member, then processing the temporarily fixed member and immersing the processed member in warm water to remove the cured composition, whereby various members such as optical members can be processed with high machining accuracy, without use of an organic solvent.

According to a preferred embodiment of the present invention, at the time of removing the cured resin of the curable composition, the cured resin is brought into contact with warm water of from 30 to 90° C. to swell and is removed in the form of a film from the member, whereby it is possible to obtain an effect of excellent working efficiency.

In the temporary fixation method of the present invention, by the use of an adhesive made of the curable composition of the present invention, it is possible to certainly obtain the above effect of the invention.

In the present invention, use of warm water appropriately heated to from 30 to 90° C. is preferred in terms of productivity because the removability in water is thereby achieved in a short period of time. With respect to the temperature of the warm water, it is preferred to use warm water of from 30° C. to 90° C., preferably from 40° C. to 90° C., because the cured resin of the adhesive becomes swollen in a short period of time and the residual stress in curing of the curable composition is released, whereby the adhesive strength will be reduced, and the vapor pressure of (D) serves as a peeling force between the member and the cured resin of the curable composition thereby enabling the cured resin of the adhesive to be removed in the form of a film from the adherend. A recommendable method for bringing the cured resin into contact with the warm water is a method of immersing the whole of the bonded member in the warm water, which is simple.

In the present invention, there are no particular restrictions on the material of the member to be temporarily fixed, and in a case where the adhesive is an ultraviolet-curable adhesive, the member is preferably one made of a UV transmitting material. Examples of such material include crystalline quartz members, glass members and plastic members, and thus the temporary fixation method of the present invention can be applied to temporary fixation in processing of crystal oscillators, glass lenses, plastic lenses and optical disks.

Further, for the member, a reinforced plastic filled with an inorganic filler such as silica, alumina, calcium carbonate or pigment, as represented by e.g. an epoxy resin for sealing, a substrate material employing it, or an opaque material such as a glass-reinforced plastic (FRP), ceramics, a metal such a stainless steel, aluminum or ferrite, or silicon, may also be mentioned.

The temporary fixation of a member by means of the curable composition of the present invention may be carried out as follows.

For example, in a case where the composition is used as a photocurable adhesive, the adhesive is first applied e.g. by a method of applying an appropriate amount of the adhesive onto a bonding surface of a member to be fixed or a support substrate, and then placing another member thereon, or a method of preliminarily stacking multiple members to be temporarily fixed, and letting the adhesive penetrate into their interspace to be applied, and thereafter the members are exposed to visible light or ultraviolet rays to cure the photocurable adhesive to temporarily fix the members.

Further, in a case where the composition is used as a one-pack type adhesive, the adhesive is first applied e.g. by a method of applying an appropriate amount of the adhesive onto a bonding surface of a member to be fixed or a support substrate, and then placing another member thereon, or a method of preliminarily stacking multiple members to be temporarily fixed, and letting the adhesive penetrate into their interspace, and thereafter the members are temporarily fixed to one another.

Further, in a case where the composition is used as a two-pack type adhesive, a method may, for example, be employed wherein the composition containing (E) is applied to a bonding surface of a member to be fixed or a support substrate, then the composition containing (F) is applied to another member, and the two members are bonded for temporary fixing.

Thereafter, the temporarily fixed members are subjected to processing such as cutting, grinding, polishing or drilling into a desired shape, and then the members are immersed in water, preferably warm water, whereby the cured resin of the adhesive can be removed from the members.

In the present invention, a substrate is employed for temporarily fixing the member, and it is preferred that the cured resin remains on the substrate when the cured resin is removed. In such a case, the substrate is selected to be one made of a material having a higher adhesive strength than the adhesive strength between the adhesive and the member to be processed, or one made of the same material but is different in the surface condition, so that consequently, the above situation can be attained.

In the present invention, as a specific embodiment whereby the above situation can be attained, the surface roughness (RMax) of the substrate on the side facing the curable composition is preferably from 10 μm to 50 μm, particularly preferably from 15 μm to 45 μm. Further, it is preferably larger by at least 10 μm, particularly preferably from 15 μm to 50 μm, than the surface roughness (RMax) of the member on the side facing the curable composition.

When the surface roughness of the substrate or the member to be processed on the side facing the curable composition is at least 10 μm, a sufficient adhesive strength can be obtained after curing of the curable composition, and when it is at most 50 μm, the cured resin can be removed within a practical time period when contacted with warm water.

Further, by adjusting the surface roughness (RMax) of the substrate on the side facing the curable composition to be larger by at least 10 μm than the surface roughness (RMax) of the member on the side facing the curable composition, it is possible to certainly remove the cured resin from the member side when contacted with warm water, so that the cured resin is temporarily maintained on the substrate side, and upon expiration of a further time, the cured resin of the curable composition can certainly be removed from the substrate. As a result, a step of removing the cured resin is not required at the time of recovering the member, and also with respect to the substrate to be used for processing, a cleaning operation may be omitted at the time of its reuse.

Now, the present invention will be described in further detail with reference to Examples and Comparative Examples, but it should be understood that the present invention is by no means restricted by such Examples.

Main materials used and their abbreviations will be shown below.

Materials Used

GR-600: Crosslinked polymethyl methacrylate particles having an average particle size of 25 μm (ART PEARL GR-600, manufactured by Negami Chemical Industrial Co., Ltd.)

GM-1005-10: Crosslinked polymethyl methacrylate particles having an average particle size of 10 μm (GANZ PEARL GM-1005-10, manufactured GANZ CHEMICAL CO., LTD.)

GM-5047: Crosslinked polybutyl methacrylate particles having an average particle size of 10 μm (GANZ PEARL GM-1005-10, manufactured GANZ CHEMICAL CO., LTD.)

SGP-150C: Crosslinked polystyrene particles having an average particle size of 55 μm (Chemisnow SGP-150C, manufactured by Soken Chemical & Engineering Co., Ltd.)

SGP-140C: Crosslinked polystyrene particles having an average particle size of 42 μm (Chemisnow SGP-140C, manufactured by Soken Chemical & Engineering Co., Ltd.)

SGP-100C: Crosslinked polystyrene particles having an average particle size of 25 μm (Chemisnow SGP-100C, manufactured by Soken Chemical & Engineering Co., Ltd.)

2100JPD: Polyethylene particles having an average particle size of 147 μm (Hi-Zex 2100JPD, manufactured by Mitsui Chemicals, Inc.)

PE-130: Polyethylene particles having an average particle size of 12.5 μm (CAERIDUST PE-130, manufactured by Clariant in Japan)

PP-6071: Polypropylene particles having an average particle size of 20 μm (CAERIDUST PP-6071, manufactured by Clariant in Japan)

LS-L100: Spherical silica particles having an average particle size of 10 μm (LS-L100, manufactured by TOKUYAMA)

2-HEMA: 2-Hydroxyethyl methacrylate

IBX: Isobornyl methacrylate (LIGHT-ESTER IBX, manufactured by KYOEISHA CHEMICAL CO., LTD.)

BZ: Benzyl methacrylate (LIGHT-ESTER BZ, manufactured by KYOEISHA CHEMICAL CO., LTD.)

MTEGMA: Methoxytetraethylene glycol monomethacrylate (NK ester M-90G, manufactured by Shin-nakamura Chemical Corporation)

NPA: Neopentyl glycol diacrylate (LIGHT-ACRYLATE NP-A, manufactured by KYOEISHA CHEMICAL CO., LTD.)

TMPTA: Trimethylolpropane triacrylate (KAYARAD TMPTA, manufactured by NIPPON KAYAKU CO., LTD.)

TPO: 2,4,6-Trimethylbenzoyl diphenylphosphine oxide (Lucirin TPO, manufactured by BASF)

I-907: 2-Methyl-1-[4-(methylthio)phenyl]-2-morpholino-propan-1-one (IRGACURE907, manufactured by Ciba Specialty Chemicals)

QM: Dicyclopentenyloxyethyl methacrylate (QM-657, manufactured by Rohm & Haas)

EXAMPLE 1-1

A curable composition was prepared by mixing a total amount of 100 parts by mass consisting of 20 parts by mass of TE-2000 manufactured by Nippon Soda Co., Ltd. (1,2-polybutadiene-terminated polyurethane methacrylate, hereinafter abbreviated as "TE-2000" and 15 parts by mass of dicyclotentanyl diacrylate (KAYARAD R-684 manufactured by Nippon KAYAKU CO., LTD., hereinafter abbreviated as "R-684" as the polyfunctional (meth)acrylates (A), and 40 parts by mass of 2-(1,2-cyclohexacarboxyimide)ethyl acrylate (ARONIX M-140 manufactured by TOAGOSEI CO., LTD., hereinafter abbreviated as "M-140") and 25 parts by mass of phenol 2 mol ethylene oxide-modified acrylate (ARONIX M-101A manufactured by TOAGOSEI CO., LTD., hereinafter abbreviated as "M-101A") as the monofunctional (meth)acrylates (B), 10 parts by mass of benzyl dimethyl ketal (hereinafter abbreviated as "BDK") as the photopolymerization initiator (C), 2 parts by mass of isopropyl alcohol (hereinafter abbreviated as "IPA") as the polar solvent (D), 0.2 part by mass of crosslinked polymethyl methacrylate particles having an average particle size of 50 μm (ART PEARL GR-200, manufactured by Negami Chemical Industrial Co., Ltd., hereinafter abbreviated as "GR-200") as the granular material (H), and 0.1 part by mass of 2,2-methylene-bis(4-methyl-6-tertiary butylphenol) (hereinafter abbreviated as "MDP") as a polymerization inhibitor. Further, the long/short diameter ratio of (H) used, was obtained by an evaluation method shown below. The results are shown in Table 1-1. Using the obtained curable composition, the measurement of tensile shear bond strength and the removing test were carried out by the following evaluation methods. The results are shown in Table 1-2.

Evaluation Methods

Long/short diameter ratio: As an index for the sphericity of (H), an average ratio of the long diameter to the short diameter of randomly selected 100 particles was obtained by feeding into an image analyzer (manufactured by Nippon Avionics Co., Ltd.) a close-up image of particles of 20,000 magnifications by a scanning electron microscope ("JSM-T200" manufactured by JEOL Ltd.)

Tensile Shear Bond Strength: The strength was measured in accordance with JIS K 6850. Specifically, Pyrex (registered trademark for heat resistant glass manufactured by Corning Incorporated) glass (25 mm×25 mm×2.0 mm in thickness) was used as an adherend, and two sheets of the Pyrex glass were bonded in a bonding area with a diameter of 8 mm with a curable composition prepared. Then, the composition was cured by a curing apparatus using an electrodeless discharge lamp (manufactured by Fusion UV Systems Inc.), under a condition of an accumulated quantity of light of 2000 mJ/cm$^2$ at a wavelength of 365 nm, thereby preparing a test piece for tensile shear bond strength. The test piece thus prepared was subjected to measurement of tensile shear bond strength by means of a universal testing machine at a temperature of 23° C. under a humidity of 50% at a pulling rate of 10 mm/min.

Removing Test: A test piece for the removing test was prepared by curing the curable composition in the same condition as above except that the curable composition prepared was applied onto the above Pyrex glass sheet and bonded to a blue sheet glass (150 mm×150 mm×1.7 mm in thickness) as a substrate. The test piece obtained was immersed in warm water (80° C.), whereby the period of time for removal of the Pyrex glass sheet was measured, and the removal state thereof was also observed.

TABLE 1-1

| (H) | Long/short diameter ratio |
|---|---|
| GR-200 | 0.90 |
| GR-600 | 0.92 |
| GM-1005-10 | 0.89 |
| GM-5047 | 0.88 |
| SGP-150C | 0.90 |
| SGP-140C | 0.93 |
| SGP-100C | 0.94 |
| 2100JPD | 0.82 |
| PE-130 | 0.80 |
| PP-6071 | 0.81 |
| LS-L100 | 0.96 |

TABLE 1-2

| | Example No. | | | | | | | | | | |
|---|---|---|---|---|---|---|---|---|---|---|---|
| | 1-1 | 1-2 | 1-3 | 1-4 | 1-5 | 1-6 | 1-7 | 1-8 | 1-9 | 1-10 | 1-11 |
| (A) (parts by mass) | | | | | | | | | | | |
| TE-2000 | 20 | 20 | 20 | 20 | 20 | 20 | 20 | 20 | 20 | 20 | 20 |
| R-684 | 15 | 15 | 15 | 15 | 15 | 15 | 15 | 15 | 15 | 15 | 15 |
| (B) (parts by mass) | | | | | | | | | | | |
| M-140 | 40 | 40 | 40 | 40 | 40 | 40 | 40 | 40 | 40 | 40 | 40 |
| M-101A | 25 | 25 | 25 | 25 | 25 | 25 | 25 | 25 | 25 | 25 | 25 |
| (C) (parts by mass) | | | | | | | | | | | |
| BDK | 10 | 10 | 10 | 10 | 10 | 10 | 10 | 10 | 10 | 10 | 10 |
| (D) (parts by mass) | | | | | | | | | | | |
| IPA | 2 | 2 | 2 | 2 | 2 | 2 | 2 | 2 | 2 | 2 | 2 |
| (H) | | | | | | | | | | | |
| GR-200 | 0.2 | 1 | 5 | | | | | | | | |
| GR-600 | | | | 0.2 | | | | | | | |
| GM-1005-10 | | | | | 0.2 | | | | | | |
| GM-5047 | | | | | | 0.2 | | | | | |
| SGP-150C | | | | | | | 0.2 | | | | |
| SGP-140C | | | | | | | | 0.2 | | | |
| SGP-100C | | | | | | | | | 0.2 | | |
| 2100JPD | | | | | | | | | | 0.2 | |
| PE-130 | | | | | | | | | | | 0.2 |
| Polymerization inhibitor (part by mass) | | | | | | | | | | | |
| MDP | 0.1 | 0.1 | 0.1 | 0.1 | 0.1 | 0.1 | 0.1 | 0.1 | 0.1 | 0.1 | 0.1 |
| Adhesive strength (MPa) | 12.3 | 11.1 | 10.2 | 9.8 | 13.1 | 10.8 | 10.6 | 12.5 | 13.7 | 9.4 | 10.2 |
| Time for removal in warm water at 80° C. (min) | 30 | 25 | 22 | 60 | 80 | 76 | 45 | 54 | 69 | 15 | 85 |
| Removal state* | film form | film form | film form | film form | film form | film form | film form | film form | film form | film form | film form |

*)Film form: The cured resin was removed in the form of a film from the glass surface with no adhesive residue.

EXAMPLES 1-2 TO 1-16

Curable compositions were prepared in the same manner as in Example 1-1 except that raw materials of types as identified in Tables 1-2 and 1-3 were used in compositions as identified in Tables 1-2 and 1-3. The measurement of tensile shear bond strength and the removing test were carried out in the same manner as in Example 1-1, with respect to the cured resins of the curable compositions prepared. The results are shown in Tables 1-2 and 1-3.

TABLE 1-3

| | Example No. | | | | |
|---|---|---|---|---|---|
| | 1-12 | 1-13 | 1-14 | 1-15 | 1-16 |
| (A) (parts by mass) | | | | | |
| TE-2000 | 20 | 20 | 20 | 20 | 20 |
| R-684 | 15 | 15 | 15 | 15 | 15 |
| (B) (parts by mass) | | | | | |
| M-140 | 40 | 40 | 40 | 40 | 40 |
| M-101A | 25 | 25 | 25 | 25 | 25 |
| (C) (parts by mass) | | | | | |
| BDK | 10 | 10 | 10 | 10 | 10 |
| (D) (parts by mass) | | | | | |
| IPA | 2 | 2 | 2 | 2 | 2 |
| (H) (parts by mass) | | | | | |
| PP-6071 | 0.2 | | | | |
| LS-L100 | | 0.1 | 0.5 | 1 | 5 |
| Polymerization inhibitor (part by mass) | | | | | |
| MDP | 0.1 | 0.1 | 0.1 | 0.1 | 0.1 |
| Adhesive strength (MPa) | 11.3 | 10.1 | 11.2 | 10.8 | 11.1 |
| Time for removal in warm water at 80° C. (min) | 32 | 60 | 83 | 72 | 66 |
| Removal state* | film form | film form | film form | film form | film form |

*)Film form: The cured resin was removed in the form of a film from the glass surface with no adhesive residue.

COMPARATIVE EXAMPLES 1-1 TO 1-5

Curable compositions were prepared in the same manner as in Example 1-4 except that raw materials of types as identified in Table 1-4 were used in compositions as identified in Table 1-2. The measurement of tensile shear bond strength and the removing test were carried out in the same manner as in Example 1-1 with respect to the cured resins of the curable compositions prepared. The results are shown in Table 1-4.

TABLE 1-4

| | Comparative Example No. | | | | |
|---|---|---|---|---|---|
| | 1-1 | 1-2 | 1-3 | 1-4 | 1-5 |
| (A) (parts by mass) | | | | | |
| TE-2000 | | | | | |
| R-684 | | | | | |
| (B) (parts by mass) | | | | | |
| BZ | 40 | | | | |
| IBX | 60 | | | 30 | |

TABLE 1-4-continued

| | Comparative Example No. | | | | |
|---|---|---|---|---|---|
| | 1-1 | 1-2 | 1-3 | 1-4 | 1-5 |
| Other components (parts by mass) | | | | | |
| 2-HEMA | | | | | 70 |
| MTEGMA | | 100 | | 70 | |
| Acryloyl morpholine | | | 100 | 30 | |
| (C) (parts by mass) | | | | | |
| BDK | 5 | 1.5 | 1.5 | | |
| TPO | | | | 2.0 | 2.0 |
| (D) (parts by mass) | | | | | |
| IPA | 2 | | | | |
| Polymerization inhibitor (part by mass) | | | | | |
| MDP | 0.1 | 0.1 | 0.1 | 0.1 | 0.1 |
| Adhesive strength (MPa) | 17.5 | 2.0 | 2.0 | 8.4 | 12.3 |
| Time for removal in warm water at 80° C. (min) | Not removed | 30 | 30 | 60 | Not removed |
| Removal state* | | Adhesive residue | Adhesive residue | Adhesive residue | |

**)Adhesive residue: A cured resin remained on the glass surface, though the glass was removed.

EXAMPLE 1-17

The curable composition of Example 1-1 was applied to a polyethylene terephthalate (hereinafter abbreviated as PET) film of 200 mm×200 mm, and the film was bonded to a Pyrex glass sheet of 150 mm×150 mm×2 mm. A constant load was applied to the glass sheet by a weight for 10 minutes so that the pressure became 32 kg/cm², followed by curing in the same manner as in Example 1-1. Thereafter, the PET film was peeled, and the thickness of the composition cured on the glass sheet of 150 mm×150 mm was measured by a micrometer at optional 16 portions of the cured composition divided into 16 sections. The results are shown in FIG. 1-1. As a result, it was found that substantially a constant film thickness can be obtained.

EXAMPLE 1-18

A Pyrex glass sheet of 150 mm×150 mm×2 mm and the blue sheet glass used in Example 1-1 as dummy glass were bonded with the curable composition of Example 1-1 and the composition was cured in the same manner as in Example 1-1. Only the Pyrex glass portion of this adhesive test piece was cut in the size of 10 mm square by means of a dicing apparatus. No dropping of the Pyrex glass sheet occurred during cutting, thus showing good processability. The adhesive test piece having only the Pyrex glass portion cut was immersed in warm water at 80° C., whereby the entire adhesive was removed in 60 minutes. In addition, ten cut test pieces after the removal were arbitrarily selected and taken, and the back side (the side temporarily fixed with the curable composition) of each cut test piece was observed by an optical microscope, to measure the maximum width of chipped portions of the glass sheet, and to calculate the average value and the standard deviation thereof. The results are shown in Table 1-5.

TABLE 1-5

Maximum widths of chipped portions on the backside of ten cut test pieces. (μm)

| | Cut test piece No. | | | | | | | | | | | Standard |
|---|---|---|---|---|---|---|---|---|---|---|---|---|
| | 1 | 2 | 3 | 4 | 5 | 6 | 7 | 8 | 9 | 10 | Average | deviation |
| Example 1-18 | 54 | 44 | 45 | 41 | 52 | 56 | 39 | 45 | 47 | 46 | 46.9 | 5.2 |
| Comparative Example 1-6 | 44 | 51 | 70 | 52 | 47 | 42 | 49 | 50 | 59 | 51 | 51.5 | 7.6 |
| Comparative Example 1-7 | 80 | 93 | 75 | 103 | 84 | 92 | 76 | 99 | 109 | 118 | 92.9 | 13.7 |

COMPARATIVE EXAMPLE 1-6

A hot-melt type adhesive (ADFIX A manufactured by NIKKA SEIKO CO., LTD.) was heated and melted at 90° C., to bond a 150 mm×150 mm×2 mm Pyrex glass sheet and the blue sheet glass used in Example 1-1. Only the Pyrex glass portion of the bonded test piece was cut in the size of 10 mm square by means of a dicing apparatus. No dropping of the Pyrex glass occurred during cutting, thus showing good processability. The test piece was immersed in an N-methylpyrrolidone solution for one day and then cut test pieces were collected. In the same manner as in Example 1-8, ten cut test pieces after the removal were arbitrarily selected, and the back side (the side temporarily fixed with the hot-melt type adhesive) of each cut test piece was observed by an optical microscope, to measure the maximum width of chipped portions of the glass sheet, and to calculate the average value and the standard deviation thereof. The results are shown in Table 1-5.

COMPARATIVE EXAMPLE 1-7

A 150 mm×150 mm×2 mm Pyrex glass sheet was bonded with a UV-curable PET adhesive tape. Only the Pyrex glass portion of the bonded test piece was cut in the size of 10 mm square by means of a dicing apparatus. The adhesive tape portion of the test piece was irradiated with ultraviolet rays, to reduce the adhesive strength, and then cut test pieces were collected. In the same manner as in Example 1-18, ten cut test pieces after the removal were arbitrarily selected, and the back side (the side temporarily fixed with the adhesive tape) of each cut test piece was observed by an optical microscope, to measure the maximum width of chipped portions of the glass sheet, and to calculate the average value and the standard deviation thereof. The results are shown in Table 1-5.

EXAMPLE 2-1

A composition was prepared by mixing a total amount of 100 parts by mass consisting of 20 parts by mass of TE-2000 manufactured by NIPPON SODA CO., LTD. (1,2-polybutadiene-terminated urethane methacrylate, hereinafter abbreviated as "TE-2000") and 15 parts by mass of dicyclopentanyl diacrylate (KAYARAD R-684 manufactured by NIPPON KAYAKU CO., LTD., hereinafter abbreviated as "R-684") as the polyfunctional (meth)acrylates (A), and 40 parts by mass of 2-(1,2-cyclohexacarboxyimide)ethyl acrylate (ARONIX M-140 manufactured by TOAGOSEI CO., LTD., hereinafter abbreviated as "M-140") and 25 parts by mass of phenol 2 mol ethylene oxide-modified acrylate (ARONIX M-101A manufactured by TOAGOSEI CO., LTD., hereinafter abbreviated as "M-101A") as the monofunctional (meth)acrylates (B), 1.25 parts by mass of cumene hydroperoxide (PERCUMYL H-80 manufactured by NOF CORPORATION, hereinafter abbreviated as "CHP") as the organic peroxide (E), 2 parts by mass of isopropyl alcohol (hereinafter abbreviated as "IPA"), as the polar solvent (D), 0.2 part by mass of crosslinked polymethyl methacrylate particles having an average particle size of 50 μm (ART PEARL GR-200, manufactured by Negami Chemical Industrial Co., Ltd., hereinafter abbreviated as "GR-200") and 0.15 part by mass of 2,2-methylene-bis(4-methyl-6-tertiary butylphenol) (hereinafter abbreviated as "MDP") as a polymerization inhibitor.

To the obtained composition, 1.25 parts by mass of cobalt octenate (OCTLIFE Co12, manufactured by SHINTO FINE K.K., hereinafter abbreviated as "Oct-Co") as the decomposition accelerator (F) for the organic peroxide, was added to prepare a curable composition. Using the obtained curable composition, the measurement of tensile shear bond strength and the removing test were carried out by the following evaluation methods. The results are shown in Table 2-1.

Evaluation Methods

Curing time: After obtaining the curable composition, the time until the composition lost fluidity and became a cured resin under a temperature condition of 23° C., was measured.

Tensile Shear Bond Strength: The strength was measured in accordance with JIS K 6850. Specifically, an iron test piece (SPCC, 100×25×1.6 mm) was used as an adherend, and two sheets of the iron test piece were bonded in a bonding area of 25 mm×12.5 mm with a curable composition prepared, followed by aging for one day under a temperature condition of 23° C., thereby preparing a test piece for tensile shear bond strength. The test piece thus prepared was subjected to measurement of tensile shear bond strength by means of a universal testing machine at a pulling rate of 10 mm/min. Further, a Pyrex glass sheet (25 mm×25 mm×2.0 mm in thickness) was used as an adherend, and two sheets of the Pyrex glass sheet were bonded in a bonding area with a diameter of 8 mm by the curable composition prepared, followed by aging for one day under a temperature condition of 23° C., thereby preparing a test piece for tensile shear band strength. The tensile shear bond strength was measured in the same manner as of the iron test piece.

Removing Test: A test piece for the removing test was prepared by curing the curable composition in the same condition as above except that the curable composition prepared was applied onto the above Pyrex glass sheet and bonded to a blue sheet glass (150 mm×150 mm×1.7 mm in thickness) as a substrate. The test piece obtained was immersed in warm water (80° C.), whereby the period of time for removal of the Pyrex glass was measured, and the removal state thereof was also observed.

TABLE 2-1

| | Example No. | | | | | | |
|---|---|---|---|---|---|---|---|
| | 2-1 | 2-2 | 2-3 | 2-4 | 2-5 | 2-6 | 2-7 |
| (A) (parts by mass) | | | | | | | |
| TE-2000 | 20 | 20 | 20 | 20 | 20 | 20 | 35 |
| R-684 | 15 | 15 | 15 | | | 5 | 15 |
| NPA | | | | 15 | | | |
| TMPT-M | | | | | 15 | | |
| (B) (parts by mass) | | | | | | | |
| M-140 | 40 | 40 | 40 | 40 | 40 | 40 | 20 |
| M-101A | 25 | 25 | 25 | 25 | 25 | | |
| BZ | | | | | | 35 | |
| QM | | | | | | | 30 |
| (E) (parts by mass) | | | | | | | |
| CHP | 1.25 | 1.5 | 2.5 | 1.25 | 1.25 | 1.25 | 1.25 |
| (F) (parts by mass) | | | | | | | |
| Oct-Co | 1.25 | 2 | 2 | 1.25 | 1.25 | 1.25 | 1.25 |
| (D) (parts by mass) | | | | | | | |
| IPA | 2 | 2 | 2 | 2 | 2 | 2 | 2 |
| (H) (parts by mass) | | | | | | | |
| GR-200 | 0.2 | 0.2 | 0.2 | 0.2 | 0.2 | 0.2 | 0.2 |
| Polymerization inhibitor (part by mass) | | | | | | | |
| MDP | 0.1 | 0.1 | 0.1 | 0.1 | 0.1 | 0.1 | 0.1 |
| Curing time (min) | 65 | 40 | 12 | 53 | 49 | 70 | 62 |
| Adhesive strength (MPa) | | | | | | | |
| SPCC/SPCC | 7.8 | 6.5 | 5.5 | 5.3 | 4.9 | 10.5 | 9.8 |
| Glass/glass | 12.3 | 10.1 | 7.2 | 9.3 | 8.5 | 14.7 | 13.3 |
| Time for removal in warm water at 80° C. (min) | 30 | 25 | 15 | 20 | 18 | 76 | 45 |
| Removal state*) | film form | film form | film form | film form | film form | film form | film form |

*)Film form: The cured resin was removed in the form of a film from the glass surface with no adhesive residue.

EXAMPLES 2-2 TO 2-7

Curable compositions were prepared in the same manner as in Example 2-1 except that raw materials of types as identified in Table 2-1 were used in compositions as identified in Table 2-1. The measurement of tensile shear bond strength and the removing test were carried out in the same manner as in Example 2-1, with respect to the curable compositions prepared. The results are shown in Table 2-1.

COMPARATIVE EXAMPLES 2-1 TO 2-5

Curable compositions were prepared in the same manner as in Example 2-1 except that raw materials of types as identified in Table 2-2 were used in compositions as identified in Table 2-2. The measurement of tensile shear bond strength and the removing test were carried out in the same manner as in Example 2-1 with respect to the curable compositions prepared. The results are shown in Table 2-2.

TABLE 2-2

| | Comparative Example No. | | | | |
|---|---|---|---|---|---|
| | 2-1 | 2-2 | 2-3 | 2-4 | 2-5 |
| (A) (parts by mass) | | | | | |
| TE-2000 | | | | | |
| R-684 | | | | | |
| (B) (parts by mass) | | | | | |
| BZ | 40 | | | | |
| IBX | 60 | | | | 30 |
| Other components (parts by mass) | | | | | |
| 2-HEMA | | | | | 70 |
| MTEGMA | | 100 | | 70 | |
| Acryloyl morpholine | | | 100 | 30 | |
| (H) (parts by mass) | | | | | |
| CHP | 1.25 | 1.5 | 1.5 | 1.5 | 1.5 |
| (F) (parts by mass) | | | | | |
| Oct-Co | 1.25 | 1.5 | 1.5 | 1.5 | 1.5 |
| (D) (parts by mass) | | | | | |
| IPA | | | | | |
| Polymerization inhibitor (part by mass) | | | | | |
| MDP | 0.1 | 0.1 | 0.1 | 0.1 | 0.1 |
| Curing time (min) | 90 | 240 | 65 | 125 | 190 |

TABLE 2-2-continued

| | Comparative Example No. | | | | |
|---|---|---|---|---|---|
| | 2-1 | 2-2 | 2-3 | 2-4 | 2-5 |
| Adhesive strength (MPa) | | | | | |
| SPCC/SPCC | 12.8 | 3.8 | 3.5 | 3.3 | 4.9 |
| Glass/glass | 14.3 | 4.7 | 2.2 | 7.3 | 8.5 |
| Time for removal in warm water at 80° C. (min) | Not removed | 30 | 30 | 60 | Not removed |
| Removal state* | | Adhesive residue | Adhesive residue | Adhesive residue | |

**)Adhesive residue: A cured resin remained on the glass surface, though the glass was removed.

EXAMPLE 2-8

Using the curable composition prepared in Example 2-1, the measurements of the curing time and the tensile shear bond strength, and the removing test were carried out in the same manner as in Example 2-1 except that the temperature of the atmosphere for curing was changed to −10° C., 0° C., 10° C. and 40° C. The results are shown in Table 2-3. The results shows curing without depending on the temperature and likewise show the removability.

TABLE 2-3

| | Temperature of the atmosphere for curing (° C.) | | | |
|---|---|---|---|---|
| | −10 | 0 | 10 | 40 |
| Curing time (min) | 270 | 150 | 95 | 25 |
| Adhesive strength (MPa) | | | | |
| SPCC/SPCC | 10.8 | 9.8 | 10.5 | 9.3 |
| Glass/glass | 10.1 | 9.7 | 11.2 | 7.3 |
| Time for removal at 80° C. (min) | 42 | 35 | 32 | 25 |

EXAMPLE 2-9

A Pyrex glass sheet of 150 mm×150 mm×2 mm and the blue sheet glass used in Example 2-1 as dummy glass were bonded with the curable composition prepared in Example 2-1, and the composition was cured in the same manner as in Example 2-1. Only the Pyrex glass portion of the adhesive test piece was cut in the size of 10 mm square by means of a dicing apparatus. No dropping of the Pyrex glass occurred during cutting, thus showing good processability. The adhesive test piece having only the Pyrex glass portion cut, was immersed in warm water at 80° C., whereby the entire adhesive was removed in 60 minutes. In addition, ten cut test pieces after the removal were arbitrarily selected and taken, and the back side (the side temporarily fixed with the curable composition) of each cut test piece was observed with an optical microscope, to measure the maximum width of chipped portions of glass, and to calculate the average value and the standard deviation thereof. The results are shown in Table 2-4.

TABLE 2-4

| | Maximum widths of chipped portions on the back side of ten cut test pieces (μm) | | | | | | | | | | | |
|---|---|---|---|---|---|---|---|---|---|---|---|---|
| | Cut test piece No. | | | | | | | | | | Average | Standard deviation |
| | 1 | 2 | 3 | 4 | 5 | 6 | 7 | 8 | 9 | 10 | | |
| Example 2-9 | 55 | 46 | 45 | 41 | 50 | 56 | 39 | 47 | 47 | 48 | 47.4 | 5.4 |

EXAMPLE 3-1

Preparation of Dispersed Swollen Product of Temperature Sensitive Water-Absorbing and Desorbing Polymer 1 Part by mass of Thermo Gel R-60 manufactured by KOHJIN Co., Ltd. (N-isopropyl acrylamide/acrylic acid copolymer, hereinafter abbreviated as "R-60") as the temperature-responsive polymer (G) was dissolved and mixed into 50 parts by mass of isopropyl alcohol (hereinafter abbreviated as "IPA") as the polar solvent (D) with stirring at 23° C. for 24 hours, to obtain a dispersed swollen product (1) having a (G) concentration of 0.5% (g/g).

Preparation of Curable Composition

A curable composition was prepared by mixing a total amount of 100 parts by mass consisting of 20 parts by mass of TE-2000 manufactured by NIPPON SODA CO., LTD. (1,2-polybutadiene-terminated urethane methacrylate, hereinafter abbreviated as "TE-2000") and 15 parts by mass of dicyclopentanyl diacrylate KAYARAD R-684 manufactured by NIPPON KAYAKU CO., LTD., hereinafter abbreviated as "R-684") as the polyfunctional (meth)acrylates (A), 40 parts by mass of 2-(1,2-cyclohexacarboxyimide)ethyl acrylate (TO-1429 manufactured by TOAGOSEI CO., LTD., hereinafter abbreviated as "TO-1429") and 25 parts by mass of phenol 2 mol-ethylene oxide-modified acrylate (ARONIX M-101A manufactured by TOAGOSEI CO., LTD., hereinafter abbreviated as "M-101A") as the monofunctional (meth)acrylates (B), 10 parts by mass of benzyl dimethyl ketal (hereinafter abbreviated as "BDK") as the photopolymerization initiator (C), 0.1 part by mass of 2,2-methylene bis(4-methyl-6-tertiary butylphenol) (hereinafter abbreviated as "MDP") as a polymerization inhibitor, and 2 parts by mass of the above dispersed swollen product (1) (0.04 part by mass as (G), and 1.94 parts by mass as (D)). Using the obtained curable composition, the measurement of tensile shear bond strength and the removing test were carried out by the following evaluation methods. The results are shown in Table 3-1.

Evaluation Methods

Tensile shear bond strength: The evaluation was carried out in the same manner as in the method disclosed in Example 1-1.

Removing test: The evaluation was carried out in the same manner as in the method disclosed in Example 1-1.

TABLE 3-1

|  | Example No. | | | | | | | | | | |
| --- | --- | --- | --- | --- | --- | --- | --- | --- | --- | --- | --- |
|  | 3-1 | 3-2 | 3-3 | 3-4 | 3-5 | 3-6 | 3-7 | 3-8 | 3-9 | 3-10 | 3-11 |
| (A) (parts by mass) | | | | | | | | | | | |
| TE-2000 | 20 | 20 | 20 | 20 | 35 | 20 | 35 | 20 | 20 | 20 | 20 |
| R-684 | 15 | 15 | 15 | 15 | 15 | 5 | 15 | 15 | 15 | 15 | 15 |
| (B) | | | | | | | | | | | |
| TO-1429 | 40 | 40 | 40 | 40 | 20 | 40 | 40 | 40 | 40 | 40 | 40 |
| M-101A | 25 | 25 | 25 | 25 |  |  |  | 25 | 25 | 25 | 25 |
| QM |  |  |  |  | 30 |  |  |  |  |  |  |
| BZ |  |  |  |  |  | 35 |  |  |  |  |  |
| IBX |  |  |  |  |  |  | 10 |  |  |  |  |
| (C) | | | | | | | | | | | |
| BDK | 10 | 10 | 10 | 10 | 10 | 10 | 10 | 5 | 1.5 |  |  |
| TPO |  |  |  |  |  |  |  |  |  | 2 |  |
| I-907 |  |  |  |  |  |  |  |  |  |  | 6 |
| Dispersed swollen product (1) | 2 | 4 | 6 | 10 | 6 | 6 | 6 | 2 | 2 | 2 | 2 |
| Polymerization inhibitor (part by mass) | | | | | | | | | | | |
| MDP | 0.1 | 0.1 | 0.1 | 0.1 | 0.1 | 0.1 | 0.1 | 0.1 | 0.1 | 0.1 | 0.1 |
| Adhesive strength (MPa) | 10.6 | 10.2 | 10.0 | 9.8 | 14.0 | 17.6 | 13.6 | 13.3 | 11.7 | 12.4 | 10.2 |
| Time for removal in warm water at 80° C. (min) | 30 | 13 | 5 | 2 | 44 | 65 | 55 | 44 | 79 | 48 | 32 |
| Removal state*) | Film form | Film form | Film form | Film form | Film form | Film form | Film form | Film form | Film form | Film form | Film form |

*)Film form: The cured resin was removed in the form of a film from the glass surface with no adhesive residue.

EXAMPLES 3-2 TO 3-11

Curable compositions were prepared in the same manner as in Example 3-1 except that using the dispersed swollen product (1) prepared in Example 3-1, raw materials of types as identified in Table 3-1 were used in compositions as identified in Table 3-1. The measurement of tensile shear bond strength and the removing test were carried out in the same manner as in Example 3-1, with respect to the compositions prepared. The results are shown in Table 3-1.

COMPARATIVE EXAMPLE 3-1

A curable composition was prepared in the same manner as in Example 3-1 except that raw materials of types as identified in Table 3-2 were used in a composition as identified in Table 3-2. The measurement of tensile shear bond strength and the removing test were carried out in the same manner as in Example 3-1, with respect to the curable composition prepared. The results are shown in Table 3-2.

EXAMPLE 3-2

| Comparative Example No. | 3-1 |
|---|---|
| (B) | |
| BZ | 40 |
| IBX | 60 |
| Other components (parts by mass) | |
| 2-HEMA | |
| MTEGMA | |
| Acryloyl morpholine | |
| (C) (parts by mass) | |
| BDK | 5 |
| TPO | |
| Polymerization inhibitor (part by mass) | |
| MDP | 0.1 |
| Adhesive strength (MPa) | 10.5 |
| Time for removal in warm water at 80° C. (min) | Not removed |
| Removal state**) | |

**)Adhesive residue: A cured resin remained on the glass surface, though the glass was removed.

EXAMPLES 3-12 AND 3-13

Using the curable compositions of Examples 3-1 and 3-4, removing test pieces were prepared in the same manner as in Example 3-1, and the removing tests were carried out by changing the temperature of warm water to 40° C., 50° C., 60° C. and 70° C. The results are shown in Table 3-3. The results show removability at any temperature.

TABLE 3-3

| | Curable composition No. | | Temperature of warm water (° C.) | | | |
|---|---|---|---|---|---|---|
| | | | 40 | 50 | 60 | 70 |
| Example 3-12 | Example 3-1 | Removal time (min) | 326 | 221 | 107 | 54 |
| Example 3-13 | Example 3-4 | Removal time (min) | 141 | 87 | 47 | 20 |

EXAMPLE 3-14

A Pyrex glass sheet of 150 mm×150 mm×2 mm and the blue sheet glass used in Example 3-1 as dummy glass were bonded with the curable composition of Example 3-1 and the composition was cured in the same manner as in Example 3-1. Only the Pyrex glass portion of the adhesive test piece was cut in the size of 10 mm square by means of a dicing apparatus. No dropping of the Pyrex glass occurred during cutting, thus showing good processability. The adhesive test piece having only the Pyrex glass portion cut was immersed in warm water at 80° C., whereby the entire adhesive was removed in 60 minutes. In addition, ten cut test pieces after the removal were arbitrarily selected and taken, and the back side (the side temporarily fixed with the curable composition) of each cut test piece was observed with an optical microscope, to measure the maximum width of chipped portions of glass, and to calculate the average value and the standard deviation thereof. The results are shown in Table 3-4.

TABLE 3-4

| | Maximum widths of chipped portions on the back side of ten cut test pieces (μm) | | | | | | | | | | | |
|---|---|---|---|---|---|---|---|---|---|---|---|---|
| | Cut test piece No. | | | | | | | | | | | Standard |
| | 1 | 2 | 3 | 4 | 5 | 6 | 7 | 8 | 9 | 10 | Average | deviation |
| Example 3-14 | 54 | 44 | 45 | 41 | 52 | 56 | 39 | 45 | 47 | 46 | 46.9 | 5.2 |

EXAMPLE 4-1

A curable composition was prepared by mixing a total amount of 100 parts by mass consisting of 20 parts by mass of TE-2000 manufactured by NIPPON SODA CO., LTD. (1,2-polybutadiene-terminated urethane methacrylate, hereinafter abbreviated as "TE-2000") and 15 parts by mass of dicyclopentanyl diacrylate (KAYARAD R-684 manufactured NIPPON KAYAKU CO., LTD., hereinafter abbreviated as "R-684") as the polyfunctional (meth)acrylates (A), and 40 parts by mass of 2-(1,2-cyclohexacarboxyimide)ethyl acrylate (TO-1429 manufactured by TOAGOSEI CO., LTD., hereinafter abbreviated as "TO-1429") and 25 parts by mass of phenol 2 mol-ethylene oxide-modified acrylate (ARONIX M-101A manufactured by TOAGOSEI CO., LTD., hereinafter abbreviated as "M-101A") as the monofunctional (meth) acrylates (B), 10 parts by mass of benzyl dimethyl ketal (hereinafter abbreviated as "BDK") as the photopolymerization initiator (C), 2 parts by mass of isopropyl alcohol (hereinafter abbreviated as "IPA") as the polar solvent (D), and 0.1 part by mass of 2,2-methylene bis(4-methyl-6-tertiary butylphenol) (hereinafter abbreviated as "MDP") as a polymerization inhibitor. Using the obtained curable composition, the measurement of tensile shear bond strength and the removing test were carried out by the following evaluation methods. The results are shown in Table 4-1.

Evaluation Methods

Tensile shear bond strength: The evaluation was carried out in the same manner as in the method described in Example 1-1.

Removing test: The evaluation was carried out in the same manner as in the method described in Example 1-1. The surfaces of Pyrex glass sheets and blue sheet glass to be coated with the adhesives, were preliminarily subjected to blast treatment, so that the surface roughness (RMax) became 1 μm. Here, the surface roughness (RMax) was measured by a stylus surface roughness meter in accordance with the surface roughness measuring method of JIS B0651.

TABLE 4-1

| | Example No. | | | | | | | | | | |
|---|---|---|---|---|---|---|---|---|---|---|---|
| | 4-1 | 4-2 | 4-3 | 4-4 | 4-5 | 4-6 | 4-7 | 4-8 | 4-9 | 4-10 | 4-11 |
| (A) (parts by mass) | | | | | | | | | | | |
| TE-2000 | 20 | 20 | 20 | 20 | 20 | 20 | 20 | 20 | 20 | 20 | 20 |
| R-684 | 15 | 15 | 15 | 15 | 15 | 15 | 15 | 15 | 15 | 15 | 15 |
| (B) (parts by mass) | | | | | | | | | | | |
| TO-1429 | 40 | 40 | 40 | 40 | 40 | 40 | 40 | 40 | 40 | 40 | 40 |
| M-101A | 25 | 25 | 25 | 25 | 25 | 25 | 25 | 25 | 25 | 25 | 25 |
| (D) | | | | | | | | | | | |
| IPA (bp 82° C.) | 2 | | | | 0.5 | 4 | 6 | 2 | 2 | 2 | 2 |
| Ethanol (bp 78° C.) | | 2 | | | | | | | | | |
| Methanol (bp 65° C.) | | | 2 | | | | | | | | |
| n-Butanol (bp 83 to 118° C.) | | | | 2 | | | | | | | |
| (C) (parts by mass) | | | | | | | | | | | |
| BDK | 10 | 10 | 10 | 10 | 10 | 10 | 10 | 5 | 1.5 | | |
| TPO | | | | | | | | | | 2 | |
| I-907 | | | | | | | | | | | 2 |
| Polymerization inhibitor (part by mass) | | | | | | | | | | | |
| MDP | 0.1 | 0.1 | 0.1 | 0.1 | 0.1 | 0.1 | 0.1 | 0.1 | 0.1 | 0.1 | 0.1 |
| Adhesive strength (MPa) | 11.6 | 11.2 | 12.0 | 9.8 | 14.0 | 10.6 | 9.6 | 13.3 | 11.7 | 12.4 | 10.2 |
| Time for removal in warm water at 80° C. (min) | 20 | 25 | 22 | 32 | 44 | 16 | 10 | 44 | 79 | 48 | 75 |
| Removal state*) | Film form | Film form | Film form | Film form | Film form | Film form | Film form | Film form | Film form | Film form | Film form |

*)Film form: The cured resin was removed in the form of a film from the glass surface with no adhesive residue.

EXAMPLES 4-2 TO 4-21

Curable compositions were prepared in the same manner as in Example 4-1 except that raw materials of types as identified in Tables 4-1 and 4-2 were used in compositions as identified in Tables 4-1 and 4-2. With respect to the obtained curable compositions, the measurement of tensile shear bond strength and the removing test were carried out in the same manner as in Example 4-1. The results are shown in Tables 4-1 and 4-2.

TABLE 4-2

| | Example No. | | | | | | | | | |
|---|---|---|---|---|---|---|---|---|---|---|
| | 4-12 | 4-13 | 4-14 | 4-15 | 4-16 | 4-17 | 4-18 | 4-19 | 4-20 | 4-21 |
| (A) (parts by mass) | | | | | | | | | | |
| TE-2000 | 20 | 20 | 20 | 20 | 10 | 10 | 0 | 0 | 20 | 35 |
| R-684 | 15 | 15 | 15 | 5 | 25 | 5 | 25 | 5 | 15 | 35 |
| (B) (parts by mass) | | | | | | | | | | |
| TO-1429 | 40 | 40 | 40 | 40 | 40 | 40 | 40 | 40 | 40 | 15 |
| QM | 25 | | | | | | | | 25 | 15 |
| M-101A | | | | | | | | | | |
| MZ | | 25 | | 35 | 25 | 45 | 35 | 55 | | |
| IBX | | | 25 | | | | | | | |

TABLE 4-2-continued

| | Example No. | | | | | | | | | |
|---|---|---|---|---|---|---|---|---|---|---|
| | 4-12 | 4-13 | 4-14 | 4-15 | 4-16 | 4-17 | 4-18 | 4-19 | 4-20 | 4-21 |
| (D) (parts by mass) | | | | | | | | | | |
| IPA (bp 82° C.) | 2 | 2 | 2 | 2 | 2 | 2 | 2 | 2 | 12 | 2 |
| (C) (parts by mass) | | | | | | | | | | |
| BDK | 5 | 5 | 5 | 5 | 5 | 5 | 5 | 5 | 10 | 10 |
| Polymerization inhibitor (part by mass) | | | | | | | | | | |
| MDP | 0.1 | 0.1 | 0.1 | 0.1 | 0.1 | 0.1 | 0.1 | 0.1 | 0.1 | 0.1 |
| Adhesive strength (MPa) | 13.9 | 10.8 | 9.8 | 16.3 | 10.7 | 21.2 | 12.8 | 9.5 | 3.7 | 2.8 |
| Time for removal in warm water at 80° C. (min) | 20 | 152 | 283 | 22 | 26 | 81 | 140 | 290 | 5 | 12 |
| Removal state*) | Film form | Film form | Film form | Film form | Film form | Film form | Film form | Film form | | |

*)Film form: The cured resin was removed in the form of a film from the glass surface with no adhesive residue.

COMPARATIVE EXAMPLES 4-1 AND 4-2

Curable compositions were prepared in the same manner as in Example 4-1 except that raw materials of types as identified in Table 4-3 were used in compositions as identified in Table 4-3. With respect to the obtained curable compositions, the measurement of tensile shear bond strength and the removing test were carried out in the same manner as in Example 4-1. The results are shown in Table 4-3.

TABLE 4-3

| Comparative Example No. | 4-1 | 4-2 |
|---|---|---|
| (A) (parts by mass) | | |
| TE-2000 | 20 | |
| R-684 | 15 | |
| (B) | | |
| TO-1429 | 40 | |
| M-101A | 25 | |
| BZ | | 40 |
| IBX | | 60 |
| (D) (parts by mass) | | |
| IPA | | 2 |
| Other components (parts by mass) | | |
| 2-HEMA | | |
| MTEGMA | | |
| Acryloyl morpholine | | |
| (C) (parts by mass) | | |
| BDK | 10 | 5 |
| TPO | | |
| Polymerization inhibitor (part by mass) | | |
| MDP | 0.1 | 0.1 |
| Adhesive strength (MPa) | 11.9 | 10.5 |
| Time for removal in warm water at 80° C. (min) | Not removed | Not removed |
| Removal state**) | | |

**)Adhesive residue: A cured resin remained on the glass surface, though the glass was removed.

EXAMPLES 4-22 TO 4-28

With respect to the curable compositions of Examples to 4-4, the measurement of tensile shear bond strength and the removing test were carried out in the same manner as in Example 4-1, except that the pressure as a condition in the blast treatment was changed to change the surface roughness of the surfaces of Pyrex glass sheets and blue sheet glass to from 15 μm to 50 μm. The results are shown in Table 4-4.

TABLE 4-4

| | Example No. | | | | | | |
|---|---|---|---|---|---|---|---|
| | 4-22 | 4-23 | 4-24 | 4-25 | 4-26 | 4-27 | 4-28 |
| (A) (parts by mass) | | | | | | | |
| TE-2000 | 20 | 20 | 20 | 20 | 20 | 20 | 20 |
| R-684 | 15 | 15 | 15 | 15 | 15 | 15 | 15 |
| (B) (parts by mass) | | | | | | | |
| TO-1429 | 40 | 40 | 40 | 40 | 40 | 40 | 40 |
| M-101A | 25 | 25 | 25 | 25 | 25 | 25 | 25 |
| (D) (parts by mass) | | | | | | | |
| IPA (bp 82° C.) | 2 | | | | 2 | 2 | 2 |
| Ethanol (bp 78° C.) | | 2 | | | | | |
| Methanol (bp 65° C.) | | | 2 | | | | |
| n-Butanol (bp 83 to 118° C.) | | | | 2 | | | |
| (C) (parts by mass) | | | | | | | |
| BDK | 10 | 10 | 10 | 10 | 10 | 10 | 10 |
| TPO | | | | | | | |
| I-907 | | | | | | | |
| Polymerization inhibitor (part by mass) | | | | | | | |
| MDP | 0.1 | 0.1 | 0.1 | 0.1 | 0.1 | 0.1 | 0.1 |
| Surface roughness of substrate (μm) | 15 | 15 | 15 | 15 | 30 | 40 | 50 |

TABLE 4-4-continued

| | Example No. | | | | | | |
|---|---|---|---|---|---|---|---|
| | 4-22 | 4-23 | 4-24 | 4-25 | 4-26 | 4-27 | 4-28 |
| Adhesive strength (MPa) | 11.4 | 11.8 | 11.9 | 12.1 | 11.7 | 11.7 | 11.9 |
| Time for removal in warm water at 80° C. (min) | 24 | 21 | 23 | 22 | 24 | 21 | 20 |
| Removal state***) | subst | subst | subst | subst | subst | subst | subst |

***)subst: A cured composition remained on the substrate glass.

EXAMPLES 4-29 AND COMPARATIVE EXAMPLE 4-3

Using the compositions of Example 4-1 and Comparative Example 1-5 respectively, test pieces for the removing test and for the measurement of tensile shear bond strength were prepared by curing the curable compositions by means of a curing apparatus using an electrodeless discharge lamp (manufactured by Fusion UV Systems Inc.) under different accumulated light quantities of 500, 1000, 2000 and 4000 mJ/cm$^2$ at a wavelength of 365 nm. Except for such changes, the measurement of tensile shear bond strength and the removing test were carried out in the same manner as in Example 4-1. The results are shown in Table 4-5.

TABLE 4-5

| | Curable composition | | Accumulated light quantities (mJ/cm$^2$) | | | |
|---|---|---|---|---|---|---|
| | | | 500 | 1000 | 2000 | 4000 |
| Example 4-29 | Example 4-1 | Adhesive strength (MPa) | 10.2 | 10.5 | 11.6 | 10.3 |
| | | Removal time (min) | 16 | 15 | 20 | 10 |
| Comparative Example 4-3 | Comparative Example 1-54 | Adhesive strength (MPa) | 0 | 0 | 12.3 | 9.8 |
| | | Removal time (min) | — | — | Not removed | Not removed |

EXAMPLE 4-30 AND 4-31

Using the curable compositions of Example 4-1 and 4-7, removing test pieces were prepared in the same manner as in Example 4-1, and removing tests were carried out by changing the temperature of warm water to 40° C., 50° C., 60° C. and 70° C., respectively. The results are shown in Table 4-6. The results show the removability at any temperature.

TABLE 4-6

| | Curable composition | | Temperature of warm water (° C.) | | | |
|---|---|---|---|---|---|---|
| | No. | | 40 | 50 | 60 | 70 |
| Example 4-30 | Example 4-1 | Removal time (min) | 353 | 267 | 185 | 84 |
| Example 4-31 | Example 4-7 | Removal time (min) | 192 | 143 | 99 | 70 |

EXAMPLE 4-32

A Pyrex glass sheet of 150 mm×150 mm×2 mm and the blue sheet glass used in Example 4-1 as dummy glass were bonded with the curable composition in Example 4-1, and the composition was cured in the same manner as in Example 4-1. Only the Pyrex glass portion of the adhesive test piece was cut in the size of 10 mm square by means of a dicing apparatus. No dropping of the Pyrex glass occurred during cutting, thus showing good processability. The adhesive test piece having only the Pyrex glass portion cut was immersed in warm water at 80° C., whereby the entire adhesive was removed in 60 minutes. In addition, ten cut test pieces after the removal were arbitrarily selected and taken, and the back side (the side temporarily fixed with the composition) of each cut test piece was observed with an optical microscope, to measure the maximum width of chipped portions of glass, and to calculate the average value and the standard deviation thereof. The results are shown in Table 4-7.

EXAMPLE 4-7

| | Maximum widths of chipped portions on the back side of ten cut test pieces (μm) | | | | | | | | | | | |
|---|---|---|---|---|---|---|---|---|---|---|---|---|
| | Cut test piece No. | | | | | | | | | | | Standard |
| | 1 | 2 | 3 | 4 | 5 | 6 | 7 | 8 | 9 | 10 | Average | deviation |
| Example 4-32 | 54 | 44 | 45 | 41 | 52 | 56 | 39 | 45 | 47 | 46 | 46.9 | 5.2 |

EXAMPLE 4-33 AND COMPARATIVE EXAMPLES 4-4 AND 4-5

Using the curable compositions of Example 4-1 and Comparative Examples 1-4 and 1-5, each of them was cured in a shape of 30 mm×10 mm×1 mm by means of a curing apparatus using an electrodeless discharge lamp (manufactured by Fusion UV Systems Inc.) with an accumulated quantity of light having a wavelength of 365 nm being 4,000 mJ/cm$^2$. The initial weight of such a cured resin was measured, and then it was immersed in water at 25° C. for 24 hours, whereupon the weight of the cured resin was measured. The swelling degree of each curable composition was calculated by the formula, swelling degree (%)=(weight of the cured resin after immersion−initial weight of the cured resin)/(initial weight of the cured resin)×100. The results are shown in Table 4-8. As a result, it was found that as compared with the curable composition employing a hydrophilic (meth)acrylate as in the Comparative Examples, the curable composition of Example 4-1 has a low swelling degree even when immersed in water at 25° C. and thus is scarcely affected by e.g. water to be used during cutting.

TABLE 4-8

|  | Curable composition No. | Swelling degree (%) |
| --- | --- | --- |
| Example 4-33 | Example 4-1 | 0.8 |
| Comparative Example 4-4 | Comparative Example 1-4 | 100 |
| Comparative Example 4-5 | Comparative Example 1-5 | Not measurable since dissolved |

INDUSTRIAL APPLICABILITY

The curable composition of the present invention has a normal temperature curability and a photocurable property by virtue of its composition and is curable with visible light or ultraviolet rays, and the cured resin thereof shows a high adhesive strength without being affected by cutting water, and thus provides the effects of inducing little displacement during processing of a member and readily obtaining a member excellent in dimensional accuracy. Furthermore, it is characterized in that it loses the adhesive strength when contacted with warm water, whereby the bonding strength between members or between a member and a jig, will be reduced so that the member can be readily removed. Therefore, it is industrially useful as an adhesive for temporary fixation of optical lenses, prisms, arrays, silicon wafers, semiconductor packaging parts, and so on.

The method for temporarily fixing a member according to the present invention uses the above-mentioned characteristic composition, whereby it is unnecessary to use an organic solvent, which used to be needed in the conventional technologies, and it is excellent in the working efficiency since the cured resin can be recovered in the form of a film from the member.

The entire disclosures of Japanese Patent Application No. 2005-194752 filed on Jul. 4, 2005, Japanese Patent Application No. 2005-224101 filed on Aug. 2, 2005, Japanese Patent Application No. 2005-239987 filed on Aug. 22, 2005 and Japanese Patent Application No. 2005-278984 filed on Sep. 27, 2005 including the specification, claims, drawings and summary are incorporated herein by reference in their entireties.

The invention claimed is:

1. A method for temporarily fixing a member, which comprises
   temporarily fixing the member with a curable composition comprising (A) a polyfunctional (meth)acrylate, (B) phenol 2-mol ethylene oxide-modified acrylate, (C) a photopolymerization initiator, (D) a polar solvent, and (H) at least one granular material selected from the group consisting of polypropylene particles, crosslinked polymethyl methacrylate particles and crosslinked polystyrene particles,
   processing the temporarily fixed member, and
   immersing the processed member in warm water of from 30 to 90° C., thereby removing a cured resin of the curable composition.

2. The method according to claim 1, wherein each of (A) and (B) is hydrophobic.

3. The method according to claim 1, wherein (D) is at least one member selected from the group consisting of water, methanol, ethanol, isopropyl alcohol and n-butanol.

4. The method according to claim 1, wherein (H) is spherical.

5. The method according to claim 1, wherein (H) is at least one member selected from the group consisting of crosslinked polymethyl methacrylate particles, and crosslinked polystyrene particles.

6. The method according to claim 1, which comprises from 1 to 50 parts by mass of (A), from 5 to 95 parts by mass of (B), from 0.1 to 20 parts by mass of (C) and from 0.1 to 10 parts by mass of (D).

7. The method according to claim 1, wherein the curable composition contains from 0.5 to 10 parts by mass of (H).

8. The method for temporarily fixing a member according to claim 1, wherein a substrate is used for temporarily fixing the member, and the cured resin remains on the substrate when the cured resin is removed.

9. The method for temporarily fixing a member according to claim 8, wherein the surface roughness (RMax) of the substrate on the side facing the curable composition is from 10 μm to 50 μm and is larger by at least 10 μm than the surface roughness (RMax) of the member on the side facing the curable composition.

10. The method according to claim 1, wherein the member is a UV transmitting material.

11. The method according to claim 1, wherein the member is crystalline quartz, glass, or plastic.

12. The method according to claim 1, wherein (H) is present in an amount of 0.1 to 20 parts by mass per 100 parts by mass of the total amount of (A) and (B).

* * * * *